US012726700B2

(12) United States Patent
Patil et al.

(10) Patent No.: US 12,726,700 B2
(45) Date of Patent: Sep. 1, 2026

(54) LEVERAGING HIGH DYNAMIC RANGE (HDR) MAPS FOR IMPROVED AUTO FOCUS

(71) Applicant: QUALCOMM Incorporated, San Diego, CA (US)

(72) Inventors: Shridhar Prakash Patil, Chikkodi (IN); Abhijeet Dey, Bengaluru (IN); Shrey Shailesh Gadiya, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 18/986,629

(22) Filed: Dec. 18, 2024

(65) Prior Publication Data

US 2026/0172677 A1 Jun. 18, 2026

(51) Int. Cl.
*H04N 23/67* (2023.01)
*H04N 23/73* (2023.01)
*H04N 23/741* (2023.01)
*H04N 25/704* (2023.01)

(52) U.S. Cl.
CPC ........... *H04N 23/672* (2023.01); *H04N 23/73* (2023.01); *H04N 23/741* (2023.01); *H04N 25/704* (2023.01)

(58) Field of Classification Search
CPC .... H04N 23/672; H04N 23/73; H04N 23/741; H04N 25/704
See application file for complete search history.

(56) References Cited

U.S. PATENT DOCUMENTS

2009/0102945 A1* 4/2009 Chen .................... H04N 23/741 348/229.1
2010/0103194 A1* 4/2010 Chen .................... H04N 23/741 382/168
2010/0157078 A1* 6/2010 Atanassov ................ G06T 5/40 348/222.1
2011/0176024 A1* 7/2011 Kwon .................... H04N 23/70 348/222.1
2016/0266348 A1* 9/2016 Narayanan ............... G02B 7/36
2018/0220054 A1* 8/2018 Swami ...................... G06T 5/50
2020/0304723 A1* 9/2020 Okiyama ............... G03B 15/00
2021/0377456 A1* 12/2021 Han ....................... H04N 23/67

* cited by examiner

*Primary Examiner* — Abdelaaziz Tissire
(74) *Attorney, Agent, or Firm* — Polsinelli LLP/QUALCOMM Incorporated

(57) ABSTRACT

Systems and techniques are described herein for focusing. For instance, a process can include obtaining a plurality of images captured based on a plurality of different exposures; obtaining a high dynamic range (HDR) map generated based on the plurality of images, wherein the HDR map indicates weights that are applicable to the plurality of different exposures for portions of an image; selecting, based on the HDR map, a first phase detection (PD) pixel data stream associated with a first exposure of the plurality of different exposures; and generating lens position information for focusing a lens based on the first PD pixel data stream for capturing a future image.

20 Claims, 13 Drawing Sheets

Camera 100
In focus 150
Light 175
Subject 105
Lens 110
Microlens 120
Focus Photo diode 125A
Focus Photo diode 125B
Focal plane 115
In phase 170A Camera 100
Front focus 140
Light 175
Subject 105
Lens 110
Microlens 120
Focus Photo diode 125A
Focus Photo diode 125B
Focal plane 115
Out of phase 170B Camera 100
Back focus 145
Light 175
Subject 105
Lens 110
Microlens 120
Focus Photo diode 125A
Focus Photo diode 125B
Focal plane 115
Out of phase 170C

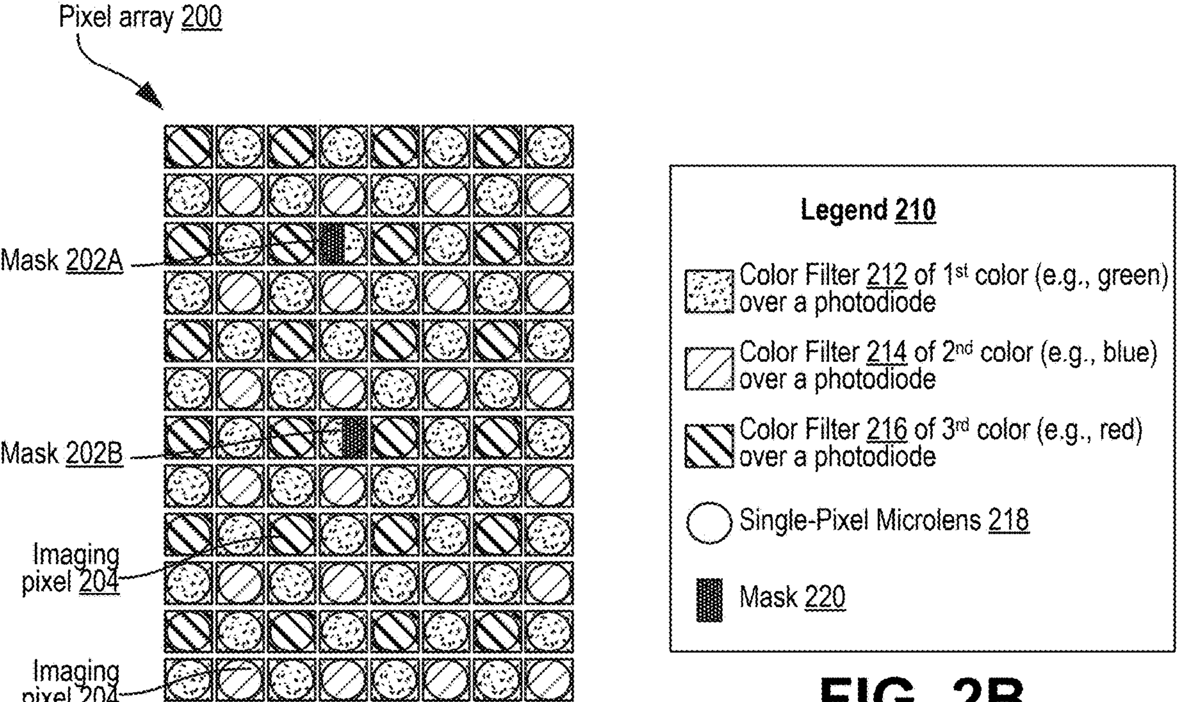
FIG. 2A
FIG. 2B
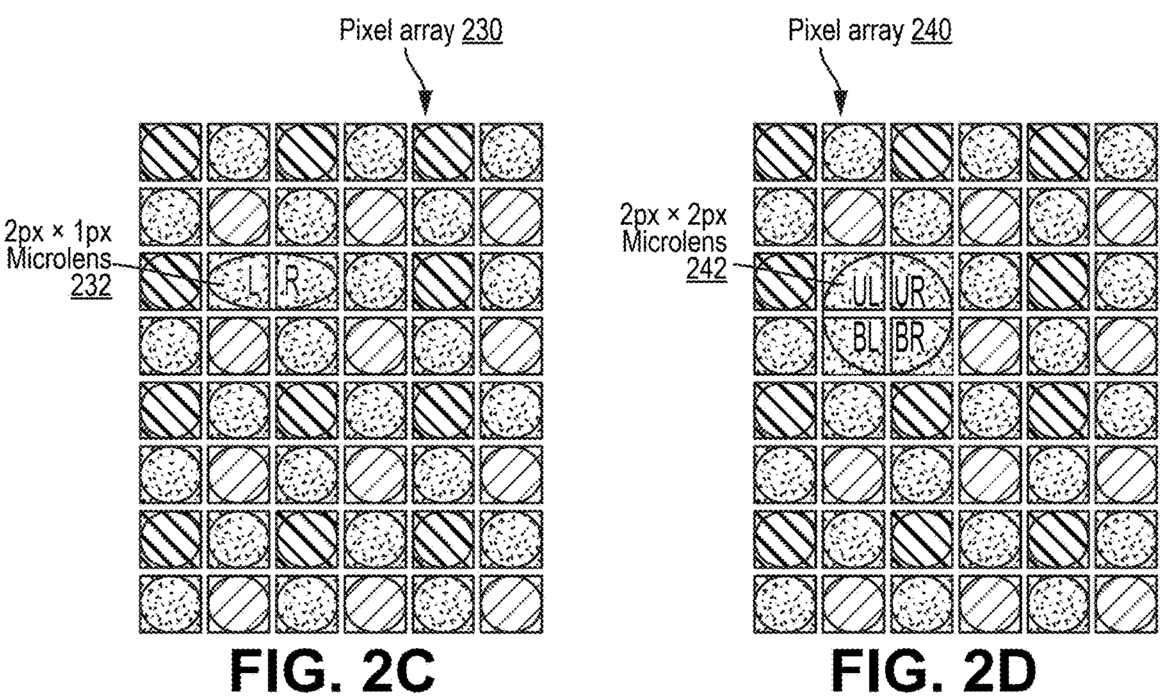
FIG. 2C
FIG. 2D

LEVERAGING HIGH DYNAMIC RANGE (HDR) MAPS FOR IMPROVED AUTO FOCUS

FIELD

The present application is generally related to performing autofocus for images. For example, aspects of the application relate to a technique for leveraging high dynamic range (HDR) maps for improved autofocus functionality.

BACKGROUND

A camera is a device that captures images, such as still images or video frames, by receiving light through a lens and by using the lens (and sometimes one or more mirrors) to bend and focus the light onto an image sensor or a photosensitive material such as photographic film. The resulting images are captured by the image sensor and either stored on the photographic film, which can be developed into printed photographs, or stored digitally onto a secure digital (SD) card or other storage device.

Many devices and systems allow a scene to be captured by generating images (or frames) and/or video data (including multiple frames). For example, a camera or a device including a camera (or cameras) can capture a sequence of frames of a scene (e.g., a video of a scene) based on light entering the camera. To enhance a quality of frames captured by the camera, the camera may include lenses to focus light entering the camera. Focus pixels may be used to detect whether the camera is focused properly and if not, how to adjust the focus.

BRIEF SUMMARY

In some examples, systems and techniques are described for focusing. For example, an apparatus for focusing is provided. The apparatus includes at least one memory and at least one processor coupled to the at least one memory and configured to: obtain a plurality of images captured based on a plurality of different exposures; obtain a high dynamic range (HDR) map generated based on the plurality of images, wherein the HDR map indicates weights that are applicable to the plurality of different exposures for portions of an image; select, based on the HDR map, a first phase detection (PD) pixel data stream associated with a first exposure of the plurality of different exposures; and generate lens position information for focusing a lens based on the first PD pixel data stream for capturing a future image.

As another example, a method for focusing is provided. The method includes: obtaining a plurality of images captured based on a plurality of different exposures; obtaining a high dynamic range (HDR) map generated based on the plurality of images, wherein the HDR map indicates weights that are applicable to the plurality of different exposures for portions of an image; selecting, based on the HDR map, a first phase detection (PD) pixel data stream associated with a first exposure of the plurality of different exposures; and generating lens position information for focusing a lens based on the first PD pixel data stream for capturing a future image.

In another example, a non-transitory computer-readable medium having stored thereon instructions is provided. The instructions, when executed by at least one processor, cause the at least one processor to: obtain a plurality of images captured based on a plurality of different exposures; obtain a high dynamic range (HDR) map generated based on the plurality of images, wherein the HDR map indicates weights that are applicable to the plurality of different exposures for portions of an image; select, based on the HDR map, a first phase detection (PD) pixel data stream associated with a first exposure of the plurality of different exposures; and generate lens position information for focusing a lens based on the first PD pixel data stream for capturing a future image.

As another example, an apparatus for focusing is provided. The apparatus includes: means for obtaining a plurality of images captured based on a plurality of different exposures; means for obtaining a high dynamic range (HDR) map generated based on the plurality of images, wherein the HDR map indicates weights that are applicable to the plurality of different exposures for portions of an image; means for selecting, based on the HDR map, a first phase detection (PD) pixel data stream associated with a first exposure of the plurality of different exposures; and means for generating lens position information for focusing a lens based on the first PD pixel data stream for capturing a future image.

In some aspects, one or more of the apparatuses described herein comprises a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device of a vehicle), or other device. In some aspects, the apparatus(es) includes at least one camera for capturing one or more images or video frames. For example, the apparatus(es) can include a camera (e.g., an RGB camera) or multiple cameras for capturing one or more images and/or one or more videos including video frames. In some aspects, the apparatus(es) includes at least one display for displaying one or more images, videos, notifications, or other displayable data. In some aspects, the apparatus(es) includes at least one transmitter configured to transmit one or more video frame and/or syntax data over a transmission medium to at least one device. In some aspects, the at least one processor includes a neural processing unit (NPU), a neural signal processor (NSP), a central processing unit (CPU), a graphics processing unit (GPU), any combination thereof, and/or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 2A illustrates a top-down view of a pixel array configuration of an image sensor with masks partially covering focus pixel photodiodes;

FIG. 2B is a legend identifying elements of FIG. 2A;

FIG. 2C illustrates a top-down view of a pixel array configuration of an image sensor with two side-by-side focus pixels covered by a 2 pixel by 1 pixel microlens;

FIG. 2D illustrates a top-down view of a pixel array configuration of an image sensor with four neighboring focus pixels covered by a 2 pixel by 2 pixel microlens;

DETAILED DESCRIPTION

Figures 1A, 1B, 1C:
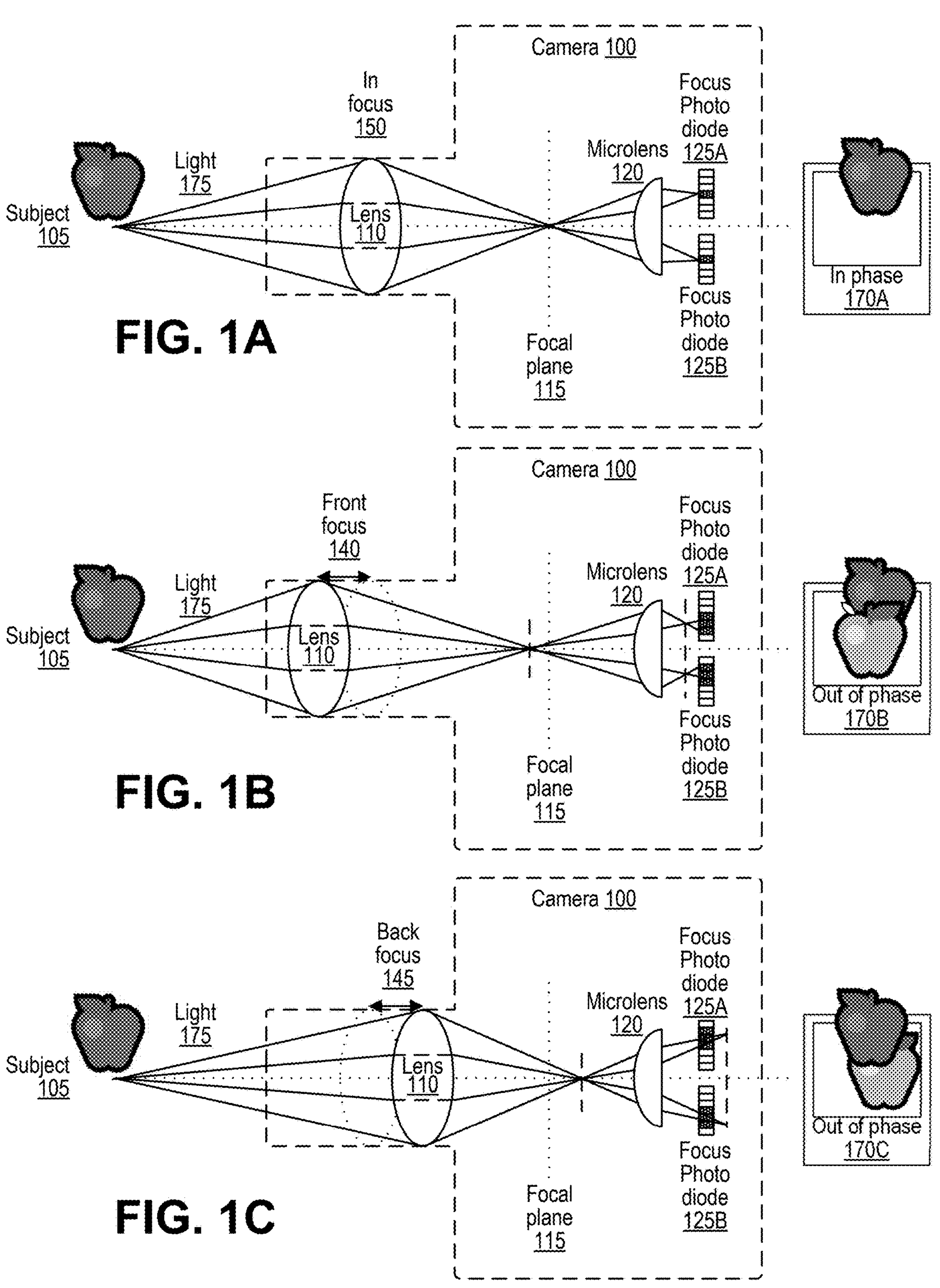
FIG. 1A illustrates a Phase Detection Auto Focus (PDAF) camera system that is in phase and therefore in focus.
FIG. 1B illustrates the PDAF camera system of FIG. 1A that is out of phase with a front focus.
FIG. 1C illustrates the PDAF camera system of FIG. 1A that is out of phase with a back focus.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during the capture of one or more image frames, such as focus, ISO, exposure time, aperture size, f/stop, shutter speed, and gain. The settings or parameters can be applied to an image sensor for capturing the one or more image frames.

As an example, some cameras include automatic focusing functionality ("autofocus") that allows the camera to focus automatically prior to capturing the desired image. Various autofocus technologies exist. Active autofocus ("active AF") relies on determining a range between the camera and a subject of the image via a range sensor of the camera, typically by emitting infrared lasers or ultrasound signals and receiving reflections of those signals. While active AF works well in many cases and can be fairly quick, cameras with active AF can be bulky and expensive.

Passive autofocus ("passive AF") uses the camera's own image sensor to focus the camera, and thus does not require additional sensors to be integrated into the camera. Passive AF techniques include Contrast Detection Auto Focus (CDAF), Phase Detection Auto Focus (PDAF), and in some cases hybrid systems that use multiple AF techniques.

In CDAF, the lens of a camera moves through a range of lens positions, typically with pre-specified distance intervals between each tested lens position, and attempts to find a lens position at which contrast between the subject's pixels and background pixels are maximized. CDAF relies on trial and error and has high latency as a result. The CDAF process also requires the motor that moves the lens to be actuated and stopped repeatedly in a short span of time every time the camera needs to focus for a photo, which puts stress on components and expends a fair amount of battery power. The camera can still fail to find a satisfactory focus using CDAF, for example if the distance interval between tested lens positions is too large, as the ideal focus may actually be between tested lens positions. CDAF may also struggle in images of subjects without high-contrast features, such as walls, or in images taken in low-light or high-light conditions where lighting conditions fade or blend features that would have higher contrast in different lighting conditions.

In PDAF, photodiodes within the camera are used to check whether light that is received by the lens of a camera from different angles converge to create a focused image that is "in phase" or fails to converge and thus creates a blurry images that is "out of phase." If light received from different angles is out of phase, the camera identifies a direction in which the light is out of phase to determine whether the lens needs to be moved forward or backward, and identifies a phase disparity indicating how out of phase the light is to determine how far the lens must be moved. In some cases, the lens is moved to the position corresponding to optimal focus.

Cameras are increasingly being added to many devices as cameras becomes smaller. Additionally, these cameras are increasingly being used in more ways, such as for high speed image capture (e.g., slow-motion), high dynamic range (HDR) image capture, generating mosaic images (e.g., composite images), digital zoom, etc. To create these HDR images, a camera system may capture multiple image frames with different exposures. For example, the camera system can create an HDR image using a short exposure (SE)

image, a medium exposure (ME) image, and a long exposure (LE) image. The camera system may then combine the multiple exposures into a single image. In some cases, a camera system may determine how to combine the multiple exposures by comparing data from one exposure, such as from the SE image. However, comparing data from a single exposure may be difficult when the exposure is under exposed and/or over exposed. In some cases, it may be useful to improve PDAF.

Systems, apparatuses, methods (also referred to as processes or techniques), and computer-readable media (collectively referred to herein as "systems and techniques") are described herein for leveraging HDR maps for improved auto focus. For example, many cameras may use HDR to improve the quality of captured images. In some cases, an HDR map may be generated as a part of generating an HDR image. As an example, a set of images may be obtained. The set of images may be captured based on a set of different exposures. In some cases, the set of exposures may include three different exposures, such as a LE image captured using a first exposure (referred to as a LE), a SE image captured using a second exposure (referred to as a SE) that is shorter in time than the first exposure, and a ME image captured using a third exposure (referred to as a ME) that is shorter in time than the first exposure and longer in time than the second exposure. An HDR map may be obtained based on the set of images. The HDR map may indicate a weight that may be applied to an exposure of the set of exposures for portions of an image. In some cases, an HDR image may be generated based on the HDR map. In some cases, the HDR map may be generated based on a previously captured image.

A set of PD pixel data streams may be received, for example, by an inline ISP. The set of PD pixel data streams may be received at a current time. The first PD pixel data stream associated with a first exposure may be selected from the set of PD pixel data streams. The first PD pixel data stream associated with the first exposure, of the set of exposures may be selected based on the HDR map. The PD pixel data stream may include pixel data from the PD pixels (e.g., PD pixel data) of an image sensor. The PD pixel data may be sent in multiple channels. For example, a PD pixel may have multiple photodiodes, such as a left and right photodiode and data from the left photodiodes PD pixels may be sent in a left channel of the PD pixel data, while data from the right photodiodes of the PD pixels may be sent in a right channel of the PD pixel data.

In some cases, a mixed data stream may be generated based on the first PD pixel data stream and a second PD pixel data stream associated with a second exposure, wherein the second PD pixel data stream is selected based on the HDR map. For example, the HDR map may indicate (e.g., via weights) that, for a particular location, a second exposure is preferred. The mixed data stream that includes the first PD pixel data stream may transition (e.g., switch) to the second PD pixel data stream when the particular location is reached. In some cases, the mixed data stream includes at least two channels, such as a right channel including PD pixel information from a right photodiode of PD pixels (e.g., the right-side photodiode 254R of FIG. 2E) and a left channel including PD pixel information from a left photodiode (e.g., the left-side photodiode 254L of FIG. 2E) of the PD pixels. PD statistics may be generated based on a difference between PD data in the first channel of the mixed data stream and PD data in the second channel of the mixed data stream. In some case, an intensity value of the PD data in the second channel may be adjusted based on a transition between first PD pixel data stream associated with the first exposure and a second PD pixel data stream associated with a second exposure.

In some cases, a PD exposure selection map may be generated based on the HDR map. The PD exposure selection map may indicate which exposures of the set of exposures, should be transmitted for inclusion in portions of a mixed data stream. The PD exposure selection may may be sent to the image sensor. A data stream from the image sensor may be received. The data stream may include the first PD pixel data stream associated with the first exposure and the second PD pixel data stream associated with a second exposure where the PD pixel data streams are selected amongst based on the PD exposure selection map.

Various aspects of the techniques described herein will be discussed below with respect to the figures.

FIG. 1A illustrates a Phase Detection Auto Focus (PDAF) camera system that is in phase and therefore in focus. Rays of light 175 may travel from a subject 105 (e.g., an apple) through a lens 110 that focuses a scene with the subject 105 onto an image sensor (not pictured in its entirety), where the image sensor includes the focus photodiode 2A and the focus photodiode 125B, which correspond to focus pixels. The focus photodiodes 125A and 125B may be associated with one or two focus pixels (e.g., focus photodiode 125A and focus photodiode 125B may be two photodiodes of a single focus pixel sharing a single microlens 120 or focus photodiode 125A may be associated with a first focus pixel and focus photodiode 125B may be associated with a second focus pixel, both focus pixels sharing a single microlens 120) of the pixel array of the image sensor. In some cases, the rays of light 175 may travel through a microlens 120 before falling on the focus photodiode 125A and the focus photodiode 125B. When the camera system 100 is in the "in focus" state 150 of FIG. 1A, the rays of light 175 may ultimately converge at a plane that corresponds to the position of the focus photodiode 125A and the focus photodiode 125B. When the camera system 100 is in the "in focus" state 150 of FIG. 1A, rays of light 175 may also converge at a focal plane 115 (also known as an image plane) after passing through the lens 110 but before reaching the microlens 120 and/or focus photodiodes 125A and 125B.

Because the camera system 100 of FIG. 1A is in an in-focus state 150, data from focus photodiodes 125A and 125B is aligned, here represented by an image 170A showing a clear and sharp representation of the subject 105 due to this alignment, as opposed to the misaligned representations of the subject 105 caused by the out-of-phase states 140 and 145 in FIG. 1B and FIG. 1C respectively. The in-focus state 150 may also be referred to as an "in-phase" state, as the data from focus photodiode 125A and the focus photodiode 125B have no phase disparity, or have very little phase disparity (e.g., phase disparity falling below a predetermined phase disparity threshold).

FIG. 1B illustrates the PDAF camera system of FIG. 1A that is out of phase with a front focus. The PDAF camera system 100 of FIG. 1B is the same as the PDAF camera system 100 of FIG. 1A, but the lens 110 is moved closer to the subject 105 and further from the focus photodiodes 125A and 125B, and is therefore in a "front focus" state 140. The lens position for the "in focus" state 150 is still drawn in FIG. 1B as a dotted outline for reference, with a double-sided arrow indicating movement of the lens between the "front focus" state 140 lens position and the "in focus" state 150 lens position.

When the camera system 100 is in the "front focus" state 140 of FIG. 1B, the rays of light 175 may ultimately converge at a plane (denoted by a dashed line) before the position of the focus photodiode 125A and the focus photodiode 125B, that is, between the microlens 120 and the focus photodiodes 125A and 125B. The rays of light 175 may also converge at a position (denoted by another dashed line) before the focal plane 115 after passing through the lens 110 but before reaching the microlens 120 and/or focus photodiodes 125A and 125B. Because the light 175 in the camera system 100 of FIG. 1B is out of phase in the "front focus" state 140, data from focus photodiodes 125A and 125B is misaligned, here represented by an image 170B showing misaligned black-colored and white-colored representations of the subject 105, where the direction of misalignment in the image 170B is related to the front focus state 140, and the distance of misalignment in the image 170B is related to the distance of the lens 110 from its position in the "in focus" state 150.

FIG. 1C illustrates the PDAF camera system of FIG. 1A that is out of phase with a back focus. The PDAF camera system 100 of FIG. 1C is the same as the PDAF camera system 100 of FIG. 1A, but the lens 110 is moved further from the subject 105 and closer to the focus photodiodes 125A and 125B, and is therefore in a "back focus" state 145 (also known as a "rear focus" state). The lens position for the "in focus" state 150 is still drawn as a dotted outline for reference, with a double-sided arrow indicating movement of the lens between the "back focus" state 145 lens position and the "in focus" state 150 lens position.

When the camera system 100 is in the "back focus" state 145 of FIG. 1C, the rays of light 175 may ultimately converge at a plane (denoted by a dashed line) beyond the position of the focus photodiode 125A and the focus photodiode 125B. The rays of light 175 may also converge at a position (denoted by another dashed line) beyond the focal plane 115 after passing through the lens 110 but before reaching the microlens 120 and/or focus photodiodes 125A and 125B. Because the rays of light 175 in the camera system 100 of FIG. 1C is out of phase in the "back focus" state 145, data from focus photodiodes 125A and 125B is misaligned, here represented by an image 170C showing misaligned black-colored and white colored representations of the subject 105, where the direction of misalignment in the image 170C is related to the back focus state 145, and the distance of misalignment in the image 170C is related to the distance of the lens 110 from its position in the focused state.

When the rays of light 175 converge before the plane of the focus photodiodes 125A and 125B as in the front focus state 140 or beyond the plane of the focus photodiodes 125A and 125B as in the back focus state 145, the resulting image produced by the image sensor may be out-of-focus or blurred. In the case that the image is out-of-focus, the lens 110 can be moved forward (toward the subject 105 and away from the photodiodes 125A and 125B) if the lens 110 is in the back focus state 145, or can be moved backward (away from the subject 105 and toward the photodiodes 125A and 125B) if the lens is in the front focus state 140. The lens 110 may be moved forward or backward within a range of positions which in some cases has a predetermined length L representing a possible range of motion of the lens in the camera system 100. The camera system 100, or a computing system therein, may determine a distance and direction of adjusting the position of the lens 110 to bring the image into focus based on one or more phase disparity values calculated as differences between data from two focus photodiodes that receive light from different directions, such as focus photodiodes 125A and 125B. The direction of movement of the lens 110 may correspond to a direction in which the data from the focus photodiodes 125A and 125B is determined to be out of phase, or whether the phase disparity is positive or negative. The distance of movement of the lens 110 may correspond to a degree or amount to which the data from the focus photodiodes 125A and 125B is determined to be out of phase, or the absolute value of the phase disparity.

The camera system 100 may include motors (not pictured) that move the lens 110 between lens positions corresponding to the different states (e.g., front focus state 140, back focus state 145, and in focus state 150) and motor actuators (not pictured) that the computing system within the camera activates to actuate the motors. The camera system 100 of FIG. 1A, FIG. 1B, and FIG. 1C may in some cases also include various additional non-illustrated components, such as lenses, mirrors, partially reflective (PR) mirrors, prisms, photodiodes, image sensors, and/or other components sometimes found in cameras or other optical equipment. In some cases, the focus photodiodes 125A and 125B may be referred to as PDAF photodiodes, PDAF diodes, phase detection (PD) photodiodes, PD diodes, PDAF pixel photodiodes, PDAF pixel diodes, PD pixel photodiodes, PD pixel diodes, focus pixel photodiodes, focus pixel diodes, pixel photodiodes, pixel diodes, or in some cases simply photodiodes or diodes.

FIG. 2A illustrates a top-down view of a pixel array configuration of an image sensor with masks partially covering focus pixel photodiodes. An image sensor of a camera system may include an array of pixels, such as the pixel array 200 of FIG. 2A. The pixel array 200 may include an array of photodiodes, which is not shown in FIG. 2A as is the photodiodes are covered by color filters (e.g., Bayer filters or other types of color filters as discussed below) and microlenses 218 as identified in the legend 210 of FIG. 2B. Photodiodes of focus pixels are also partially covered by masks 220 in the pixel array 200 of FIG. 2A.

FIG. 2B is a legend identifying elements of FIG. 2A. The legend 210 identifies that a circle represents a microlens 218 of a single pixel, and that a dark shaded rectangle represents a mask 220. The legend 210 of FIG. 2B also identifies that squares with three different patterns each represent color filters 212, 214, and 216, each color filter being for one of three different colors: red, green, or blue. That is, squares of the first pattern represent a color filter 212 for a first color, which may for example be green; squares of the second pattern represent a color filter 214 for a second color, which may for example be blue; and squares of the third pattern represent a color filter 216 for a third color, which may for example be red. These color filters are arranged in color filter arrays (CFAs) over an array of photodiodes in the pixel arrays 200, 230, and 240 of FIG. 2A, FIG. 2C, and FIG. 2D respectively. The colors (and number of colors) identified in the legend 210 of FIG. 2B, and the arrangements of color filters illustrated in the pixel arrays 200, 230, and 240 of FIG. 2A, FIG. 2C, and FIG. 2D, should be understood to be exemplary and should not be construed as limiting. Red, green, and blue color filters are traditionally used in image sensors and are often referred to as Bayer filters. Bayer filter CFAs often include more green Bayer filters than red or blue Bayer filters, for example in a proportion of 50% green, 25% red, 25% blue, to mimic sensitivity to green light in human eye physiology. Bayer filter CFAs with these proportions are sometimes referred to as BGGR, RGBG, GRGB, or RGGB, and are reflected in the presence of the color filter 212 in higher proportion than the color filters 214 and 216 in the pixel arrays 200, 230, and 240 of FIG. 2A, FIG. 2C, and FIG. 2D. Sometimes, in such Bayer filter CFAs, green is treated as two colors, labeled "Gr" and "Gb" respectively.

Some CFAs use alternate color schemes and can even include more or fewer colors. For example, some CFAs use cyan, yellow, and magenta color filters instead of the traditional red, green, and blue Bayer color filter scheme. In an arrangement referred to as cyan yellow yellow magenta (CYYM), 50% of the color filters are yellow, while 25% are cyan and 25% are magenta. Some filters also add a fourth green filter to the three cyan, yellow, and magenta filters, together referred to as a cyan yellow green magenta (CYGM) filter. Some CFAs use red, green, blue and "emerald" or cyan, referred to as an RGBE color scheme. In some cases, some mix or combination of the Bayer, CYYM, CYGM, or RGBE color schemes may be used. In some cases, color filters of one or more of the colors of the Bayer, CYYM, CYGM, or RGBE color schemes may be omitted, in some cases leaving only two colors or even one color. While the legend 210 of FIG. 2B lists precisely three color filters 212, 214, and 216, and provides green, red, and blue as examples to adhere to the traditional Bayer filter color scheme, it should be understood that more than three colors or less than three colors may alternately be used in the CFA, and that the colors may vary, for example including red, green, blue, cyan, magenta, yellow, emerald, white (transparent), or some combination thereof. Some image sensors, such as the Foveon X3® sensor, may lack color filters altogether, instead opting to use different photodiodes throughout the pixel array (optionally vertically stacked), the different photodiodes having different spectral sensitivity curves and therefore responding to different wavelengths of light. Monochrome image sensors may also lack color filters and therefore lack color depth. Use of color filters in an image sensor used with the camera systems described further herein should therefore be considered optional.

The pixel array 200 of FIG. 2A is illustrated with two pixels that are used for phase detection auto focus (PDAF), which are referred to herein as focus pixels, but may alternately be referred to as PDAF pixels or phase detection (PD) pixels. Other pixels not used for PDAF may simply be referred to as imaging pixels 204. In the pixel array 200 of FIG. 2A, any pixel without a mask 220 is an imaging pixel 204, even though only two imaging pixels 204 are specifically labeled. While two focus pixels are illustrated in the pixel array 200 of FIG. 2A, both in the same column but with three rows of imaging pixels in between, a different pixel array (not pictured) may have any number of focus pixels (i.e., one or more focus pixels), which may be arranged in any possible pattern or arrangement. In some cases, patterns of focus pixels may repeat across a pixel array, for example in "tiles" that are 8 pixels by 8 pixels in size, or 16 pixels by 16 pixels in size.

The two focus pixels illustrated in FIG. 2A are both partially covered by masks 220, the two masks 220 labeled as mask 202A and mask 202B, respectively. Each of the masks 220 may be a mask or shield made of an opaque and/or reflective material, such as a metal. Each mask 220 limits the amount and direction of light that strikes the photodiode of the focus pixel that is partially covered by the mask. The mask 202A and mask 202B each limit how much light reaches and strikes the underlying focus pixel photodiode from a particular direction, and are disposed over two different focus pixel diodes in an opposite direction to produce a pair of left and right images. For example, the mask 202A is disposed over a left side of a first focus pixel, leaving the right side of that first focus pixel to receive light entering from the right side (the right image). The mask 202B is disposed over a right side of a second focus pixel, leaving the left side of that second focus pixel to receive light entering from the left side (the left image). Because the two focus pixels are both illustrated as half-covered by the masks 220, their focus photodiodes effectively receive 50% of the light that an imaging photodiode (which would not be covered by a mask) in the same location on the pixel array would receive.

Any number of focus pixels may be included in a pixel array of an image sensor. Left and right pairs of focus pixels may be adjacent to one another, or may be spaced apart by one or more imaging pixels 204. The two pixels from a left and right pair of focus pixels may both be in the same row and/or same column of the pixel array, may be in a different row and/or different column, or some combination thereof. While masks 202A and 202B are shown within pixel array 200 as masking left and right portions of the focus pixel photodiodes, this is for exemplary purposes only. Focus pixel masks 220 may instead mask top or bottom portions of the focus pixel photodiodes, thus generating top and bottom images (or "up" and "down" images) from the focus pixel data received by the focus pixels. Like the left and right pairs of focus pixels, top and down pairs of focus pixels may both be in the same row and/or same column of the pixel array, may be in a different row and/or different column, or some combination thereof. A pixel array of an image sensor may have a focus pixel with a mask 220 over a left side of one focus pixel, a mask 220 over a right side of a second focus pixel, a mask 220 over a top side of a third focus pixel, a mask 220 over a bottom side of a fourth focus pixel, and optionally more focus pixels with any of these types of masks 220. Using focus pixels with masks 220 along multiple axes (e.g., left-right pairs of focus pixels as well as top-down pairs of focus pixels) can improve autofocus quality. One reason why autofocus quality can be improved by using focus pixels with masks 220 along multiple axes is because use of masks 220 along left and right sides of focus pixel photodiodes alone for PDAF can lead to poor focus on scenes or subjects with many horizontal edges (i.e., lines that appear along a left-right axis relative to the orientation of the focus pixels and masks 220), and use of masks 220 along top and bottom sides of focus pixel photodiodes alone for PDAF can lead to poor focus on scenes or subjects with many vertical edges (i.e., lines that appear along an up-down axis relative to the orientation of the focus pixels and masks 220).

Some PDAF camera systems do not use masks 220 on focus pixels as in FIG. 2A, but instead cover multiple pixels under a single microlens, which may alternately be referred to as an on-chip lens (OCL). FIG. 2C illustrates a top-down view of a pixel array configuration with two side-by-side focus pixels covered by a 2 pixel by 1 pixel microlens. FIG. 2D illustrates a top-down view of a pixel array configuration with four neighboring focus pixels covered by a 2 pixel by 2 pixel microlens. The pixel arrays 230 and 240 of FIG. 2C and FIG. 2D can also be interpreted based on the legend 210 of FIG. 2B.

Referring to FIGS. 2C and 2D, the 2 pixel by 1 pixel microlens 232 of FIG. 2C and the 2 pixel by 2 pixel microlens 242 of FIG. 2D both span multiple adjacent focus pixels (i.e., the microlenses cover multiple adjacent focus pixel photodiodes), and both can limit the amount and/or direction of light that strikes the focus pixel photodiodes of those focus pixels. The microlens 232 of FIG. 2C covers two horizontally-adjacent focus pixels of a pixel array 230, such that focus pixel data from both focus photodiodes may be generated, with focus pixel data from the left one of the focus pixels (labeled with an "L") representing light approaching from the left side of the pixel array 230, and focus pixel data from the right one of the focus pixels (labeled with an "R") representing light approaching from the right side of the pixel array 230. While the microlens 232 is shown within pixel array 230 as spanning left and right adjacent pixels/diodes (e.g., in a horizontal direction), this is for exemplary purposes only. A 2 pixel by 1 pixel microlens 232 may instead span top and bottom adjacent pixels/diodes (e.g., in a vertical direction), thus generating an up and down (or top and bottom) pair of focus photodiodes and corresponding pixel data.

Similarly, the microlens 242 of FIG. 2D covers a 2-pixel by 2-pixel square of four adjacent focus pixels of a pixel array 240, such that focus pixel data from all four photodiodes in the square may be generated. The focus pixel data from the four adjacent focus pixels thus includes focus pixel data from an upper-left pixel (labeled "UL" in FIG. 2D) representing light approaching from the upper-left of the pixel array 240, focus pixel data from an upper-right pixel (labelled "UR" in FIG. 2D) representing light approaching from the upper-right of the pixel array 240, focus pixel data from a bottom-left pixel (labeled "BL" in FIG. 2D) representing light approaching from the bottom-left of the pixel array 240, and focus pixel data from a bottom right pixel (labeled "BR" in FIG. 2D) representing light approaching from the bottom right of the pixel array 240. The configurations of pixel arrays 230 and 240 of FIG. 2C and FIG. 2D are exemplary; any number of focus pixels may be included within a pixel array, and may include one or more horizontally-oriented (left-right) 2-pixel by 1-pixel microlenses 232, one or more vertically-oriented (up-down) 2-pixel by 1-pixel microlenses 232, one or more 2-pixel by 2-pixel microlenses 242, or different combinations thereof.

Again referring to FIGS. 2C and 2D, once the pixel array captures a frame, thus capturing focus pixel data for each focus pixel, focus pixel data from paired focus pixels may be compared with one another. For example, focus pixel data from a left focus pixel photodiode may be compared with focus pixel data from a right focus pixel photodiode, and focus pixel data from a top focus pixel photodiode may be compared with focus pixel data from a bottom focus pixel photodiode. If the compared focus pixel data values differ, this difference is known as the phase disparity, also known as the phase difference, defocus value, or separation error. Focus pixels under a 2-pixel by 2-pixel microlens 242 as in FIG. 2D essentially have two vertically-adjacent horizontally-oriented pairs of focus pixels and/or two horizontally-adjacent vertically-oriented pairs of focus pixels. Thus, the focus pixel data from the UL focus pixel may be compared to focus pixel data from the BL focus pixel (as a top/bottom pair), focus pixel data from the UR focus pixel may be compared to focus pixel data from the BR focus pixel (as a top/bottom pair), focus pixel data from the UL focus pixel may be compared to focus pixel data from the UR focus pixel (as a left/right pair), focus pixel data from the BL focus pixel may be compared to focus pixel data from the BR focus pixel (as a left/right pair), or some combination thereof. In some cases, focus pixel data may alternately or additionally be compared between pixels that are opposite each other diagonally (along two axes). For example, focus pixel data from the UL focus pixel focus may be compared to focus pixel data from the BR focus pixel, and/or focus pixel data from the BL focus pixel focus may be compared to focus pixel data from the UR focus pixel.

While the focus pixels under the 2 pixel by 1 pixel microlens 232 of FIG. 2C and the focus pixels under the 2 pixel by 2 pixel microlens 242 of FIG. 2D are all illustrated having the color filter 212 of the first color, this is not required. In some cases, the normal pattern of the CFA of the pixel array may continue under a 2 pixel by 1 pixel microlens 232 and/or under a 2 pixel by 2 pixel microlens 242.

Figure 2E:
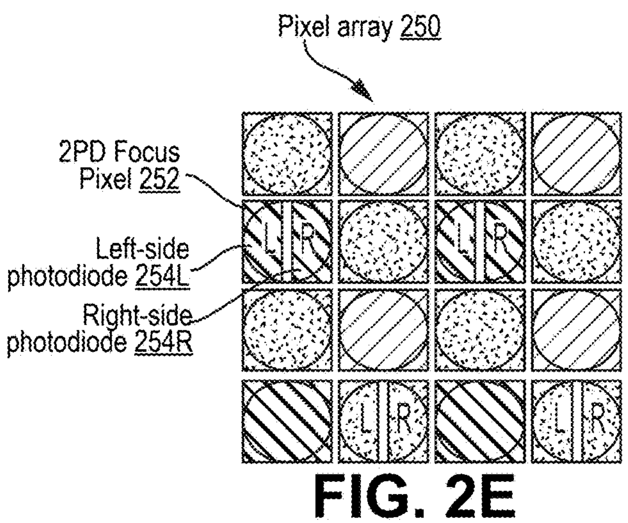
FIG. 2E illustrates a top-down view of a pixel array configuration of an image sensor in which at least one focus pixel has two photodiodes.

FIG. 2E illustrates a top-down view of a pixel array configuration of an image sensor in which at least one focus pixel has two photodiodes. In particular, a four-pixel by four-pixel pixel array 250 with four focus pixels is illustrated in FIG. 2E. The four focus pixels illustrated in the pixel array 250 each include two photodiodes, with the left-side photodiode and the right-side photodiode of each focus pixel's photodiode pair labeled "L" and "R," respectively. Focus pixels with two photodiodes, like the focus pixels of FIG. 2E, are sometimes referred to as dual photodiode focus pixels.

One of the PD focus pixels of FIG. 2E is labeled as PD focus pixel 252. The left-side photodiode (L) of the PD focus pixel 252 is labeled "left-side photodiode 254L," and the right-side photodiode (R) of the PD focus pixel 252 is labeled "right-side photodiode 254R." For each captured frame, the left photodiode 254L and the right photodiode 254R may capture light received by the PD focus pixel 252 from different angles. For a given frame, the data captured by the left photodiode 254L may be referred to as the left image or left image data, while the data captured by the right photodiode 254R may be referred to as the right image or right image data. The left image data and the right image data may be compared to determine phase disparity.

The pixel array 250 illustrated in FIG. 2E is a "sparse" PD pixel array in which only some of the pixels in the pixel array 250 include two photodiodes (namely, the focus pixels). The remaining pixels are imaging pixels and only include a single photodiode. In some cases, however a "dense" PD pixel array may be used instead, in which every pixel in the pixel array (or a higher percentage of pixels in the pixel array) include two photodiodes, and can in some cases act as both focus pixels and imaging pixels simultaneously, or can switch between acting as a focus pixel for one frame and acting as an imaging pixel for another frame. While all of the PD focus pixels of FIG. 2E are shown as "horizontal" PD focus pixels having a left photodiode and a right photodiode, this arrangement is exemplary. A pixel array with PD focus pixels may additionally or alternately include "vertical" focus pixels with a top ("up") photodiode and a bottom ("down") photodiode and/or photodiodes that are arranged diagonally with respect to one another. Since use of only horizontal focus pixels can sometimes limit recognition of horizontal edges in images, and use of only vertical focus pixels can sometimes limit recognition of vertical edges in images, use of both horizontal focus pixels and vertical focus pixels can improve focus quality by performing well even in images with many horizontal edges and/or vertical edges.

Figure 2F:
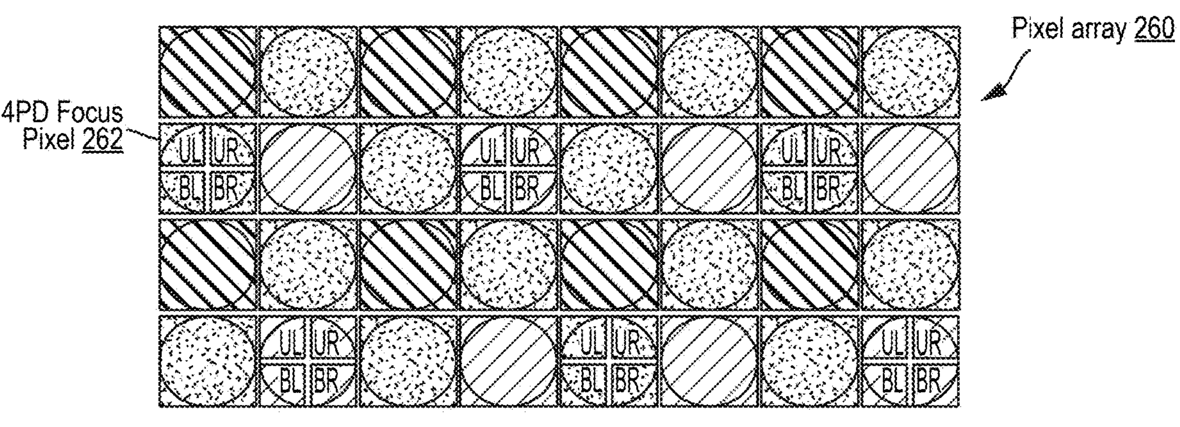
FIG. 2F illustrates a top-down view of a pixel array configuration of an image sensor in which at least one focus pixel has four photodiodes.

FIG. 2F illustrates a top-down view of a pixel array configuration of an image sensor in which at least one focus pixel has four photodiodes. The pixel array 260 illustrated in FIG. 2F includes focus pixels in which each focus pixel includes four diodes, generally referred to as 4PD focus pixels or Quadrature Phase Detection (QPD) focus pixels. For example, a 4PD focus pixel 262 is labeled in FIG. 2F, and includes an upper-left photodiode labeled with the letters "UL," an upper-right photodiode labeled with the letters "UR," a bottom-left photodiode labeled with the letters "BL," and a bottom-right photodiode labeled with the letters "BR." Data from each photodiode of the 4PD focus pixel 262 may be compared to data from an adjacent photodiode of the 4PD focus pixel 262 to determine phase difference. For example, photodiode data from the UL photodiode may be compared to photodiode data from the BL photodiode (as a top/bottom pair), photodiode data from the UR photodiode may be compared to photodiode data from the BR photodiode (as a top/bottom pair), photodiode data from the UL photodiode may be compared to photodiode data from the UR photodiode (as a left/right pair), photodiode data from the BL photodiode may be compared to photodiode data from the BR photodiode (as a left/right pair), or some combination thereof. In some cases, photodiode data from the 4PD focus pixel 262 may alternately or additionally be compared between photodiodes that are opposite each other diagonally (along two axes). For example, photodiode data from the UL photodiode of the 4PD focus pixel 262 may be compared to photodiode data from the BR photodiode of the 4PD focus pixel 262, and/or photodiode data from the BL photodiode of the 4PD focus pixel 262 may be compared to photodiode data from the UR photodiode of the 4PD focus pixel 262.

The pixel array 260 illustrated in FIG. 2F is a "sparse" 4PD pixel array in which only some of the pixels in the pixel array 260 include four photodiodes (namely, the focus pixels). The remaining pixels are imaging pixels and only include a single photodiode. In some cases, however a "dense" 4PD pixel array may be used instead, in which every pixel in the pixel array (or a higher percentage of pixels in the pixel array) include four photodiodes, and can in some cases act as both focus pixels and imaging pixels simultaneously, or can switch between acting as a focus pixel for one frame and acting as an imaging pixel for another frame. While all of the 4PD focus pixels of FIG. 2F are shown as "horizontal" 4PD focus pixels having a left photodiode and a right photodiode, this arrangement is exemplary. A pixel array with 4PD focus pixels may additionally or alternately include "vertical" focus pixels with a top ("up") photodiode and a bottom ("down") photodiode and/or photodiodes that are arranged diagonally with respect to one another. Since use of only horizontal focus pixels can sometimes limit recognition of horizontal edges in images, and use of only vertical focus pixels can sometimes limit recognition of vertical edges in images, use of both horizontal focus pixels and vertical focus pixels can improve focus quality by performing well even in images with many horizontal edges and/or vertical edges.

In some cases, a pixel array may use some combination of one or more pairs of focus pixels with masks 220 (as illustrated in FIG. 2A), one or more pairs of focus pixels covered by 2-pixel by 1-pixel microlenses 232 (as illustrated in FIG. 2C), one or more groups of focus pixels covered by 2-pixel by 2-pixel microlenses 242 (as illustrated in FIG. 2D), one or more PD focus pixels 252 (as illustrated in FIG. 2E), and/or one or more 4PD focus pixels 262 (as illustrated in FIG. 2F). In some cases, focus pixels in any of the configurations illustrated in and discussed with respect to FIG. 2A-2F may be arranged in a vertically and/or horizontally tiled pattern, such as the tiled patterns of the PD and 4PD focus pixels of FIG. 2E and FIG. 2F.

In some cases, the camera system (e.g., camera system 100 of FIG. 1A, FIG. 1B, and FIG. 1C) can create an HDR image using multiple image frames with different exposures. For example, the camera system can create an HDR image using a short exposure (SE) image, a medium exposure (ME) image, and a long exposure (LE) image. As another example, the camera system can create an HDR image using an SE image and an LE image. In some cases, the camera system can write the different image frames from one or more camera frontend engines to a memory device, such as a DDR memory device or any other memory device. A post-processing engine, for example, of an ISP (e.g., offline ISP) can then retrieve the image frames and fuse (e.g., merge, combine) them into a single image.

Figure 3:
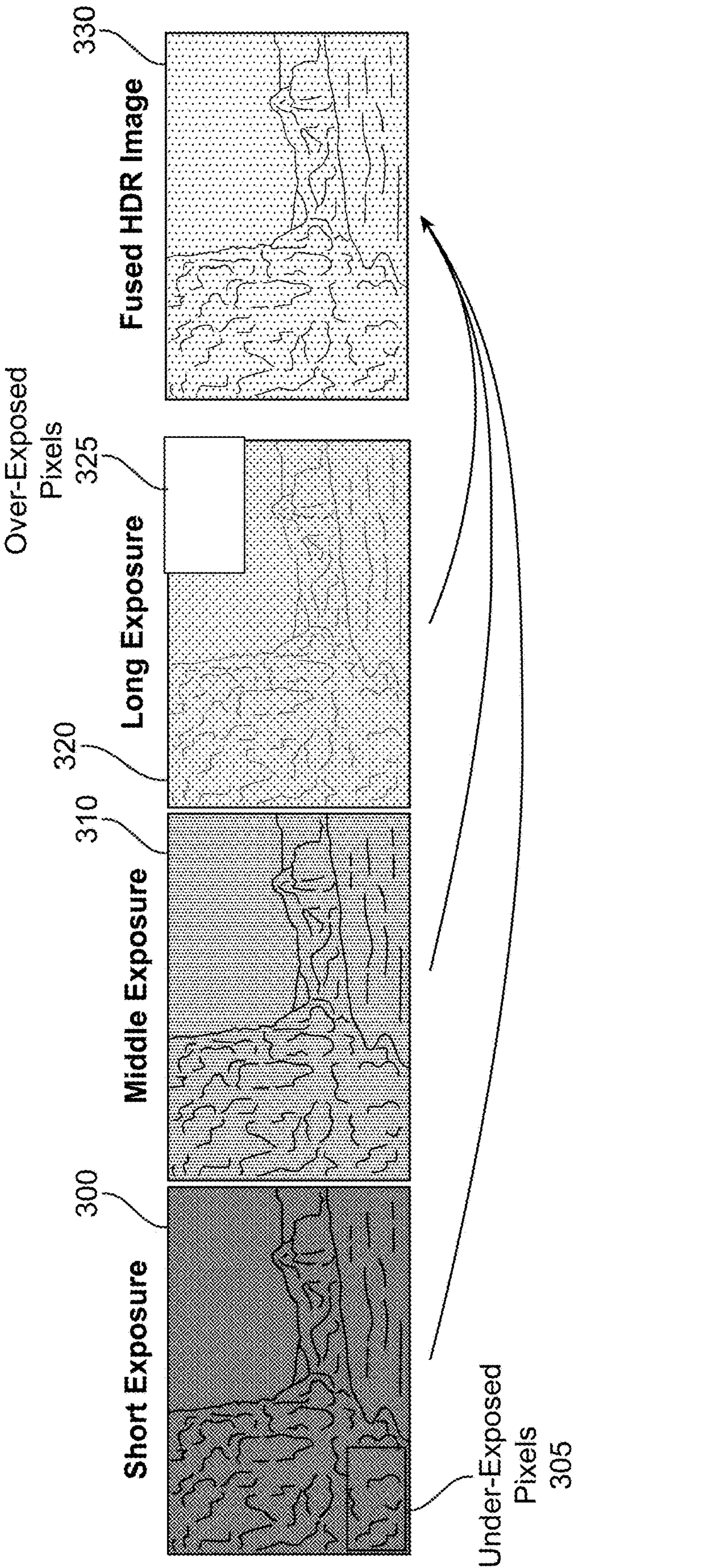
FIG. 3 illustrates multiple images with different exposures used to create a fused high dynamic range (HDR) image.

FIG. 3 illustrates multiple images with different exposures used to create a fused HDR image (e.g., HDR image 330). In particular, FIG. 3 shows a short exposure image 300, a medium exposure image 310, a long exposure image 320, and an HDR image 330 generated by combining or fusing together the short exposure image 300, the medium exposure image 310, and the long exposure image 320. The short exposure image 300 includes under-exposed pixels 305, and the long exposure image 320 includes over-exposed pixels 325.

As shown in FIG. 3, the under-exposed pixels 305 in the short exposure image 300 and the over-exposed pixels 325 in the long exposure image 320 do not contribute to the pixels of the HDR image 330. In some cases, when creating the HDR image 330, the camera system writes the under-exposed pixels 305 in the short exposure image 300 and the over-exposed pixels 325 in the long exposure image 320 from a camera frontend engine(s) of the camera system to a memory device, reads them back (e.g., via an offline image processing engine or offline ISP) from the memory device, and processes the pixels of the three images (e.g., short exposure image 300, middle exposure image 310, and long exposure image 320) to create the HDR image 330. The operations to read, write, and process the under-exposed pixels 305 in the short exposure image 300 and the over-exposed pixels 325 in the long exposure image 320 contribute to the overall power and bandwidth consumption of the camera system when creating the HDR image 330, even though such pixels do not contribute to the HDR image 330. In some cases, camera systems capable of capturing HDR images may also perform focusing using PDAF.

Figure 4:
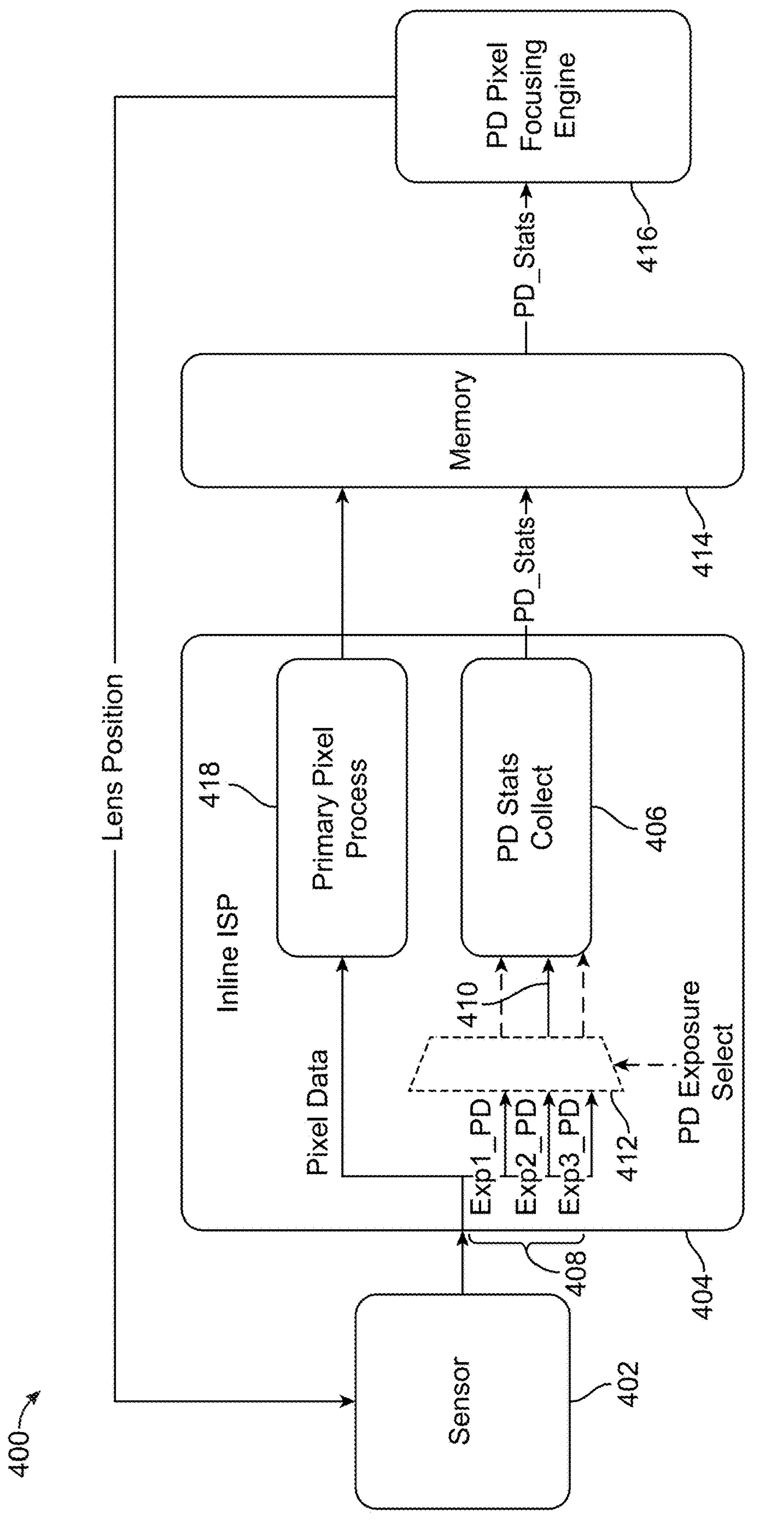
FIG. 4 is a block diagram illustrating a camera system for capturing HDR images and focusing using PDAF, in accordance with aspects of the present disclosure.

FIG. 4 is a block diagram illustrating a camera system 400 for capturing HDR images and focusing using PDAF, in accordance with aspects of the present disclosure. The camera system 400 includes a sensor 402 which may include PD pixels. In some cases, the sensor 402 may sense light from the physical environment. Photodiodes of the sensor 402 may be read in some pattern to generate a stream of data from the sensor 402 that may be passed to an inline image signal processor (ISP) 404. The inline ISP 404 may process the stream of image data in real-time (e.g., as opposed to processing the image data from a whole image (e.g., frame) at a time, as performed by an offline ISP (e.g., main ISP, ISP, etc.)). In some cases, data captured by the PD pixels (e.g., PD pixel data) may be passed into a PD statistics collection engine 406 of the inline ISP 404.

In some cases, where multiple images where different exposures are captured by the sensor 402 to generate an HDR image, the PD pixel data from the multiple exposures 408 may be collected. For example, when SE, ME, and LE images are captured, PD pixel data from each exposure may be obtained along with pixel data for non-PD pixels. In some cases, the PD pixel data from a single exposure (e.g., exposure 410) of the multiple exposures 408 may be passed into the PD statistics collection engine 406. For example, the PD pixel data from the multiple exposures 408 may be passed into a selector 412, which may select the PD pixel data from a single exposure (e.g., exposure 410) to be passed into the PD statistics collection engine 406. In some cases, the SE PD pixel data may be selected to be passed into the PD statistics collection engine 406. PD statistics may be collected from one stream of PD pixel information (e.g., from the SE image, LE image, or ME image).

In other cases, each exposure of the multiple exposures 408 may be passed into the PD statistics collection engine 406. PD statistics may then be collected from each stream of PD pixel information. In such cases, the selector 412 may be omitted.

In some cases, the PD statistics collection engine 406 may determine statistical information about the PD pixel data (e.g., PD stats) that may be used to perform PDAF. The PD statistics collection engine 406 may then write the PD stats to a memory 414. The PD stats may be loaded from the memory 414 by a PD pixel focusing engine 416. The PD pixel focusing engine 416 may determine whether an image is in focus and, if not, the PD pixel focusing engine 416 may output focusing information 420 indicating, for example, how much and which direction to move a lens of the camera system to focus the image. The focusing information may be transmitted to the sensor 402 to be used to adjust the lens for focusing. In some cases, the PD pixel focusing engine 416 may be implemented in an offline ISP, CPU, DSP, and/or another processor.

In some cases, the pixel data from the non-PD pixels (and possibly the PD pixel data as well) may be passed to a primary pixel processing engine 418 to preprocess the pixel data and output the preprocessed pixel data to the memory 414. In some cases, the preprocessed pixel data may be loaded from the memory 414 and processed by the offline ISP (not shown).

Figure 5:
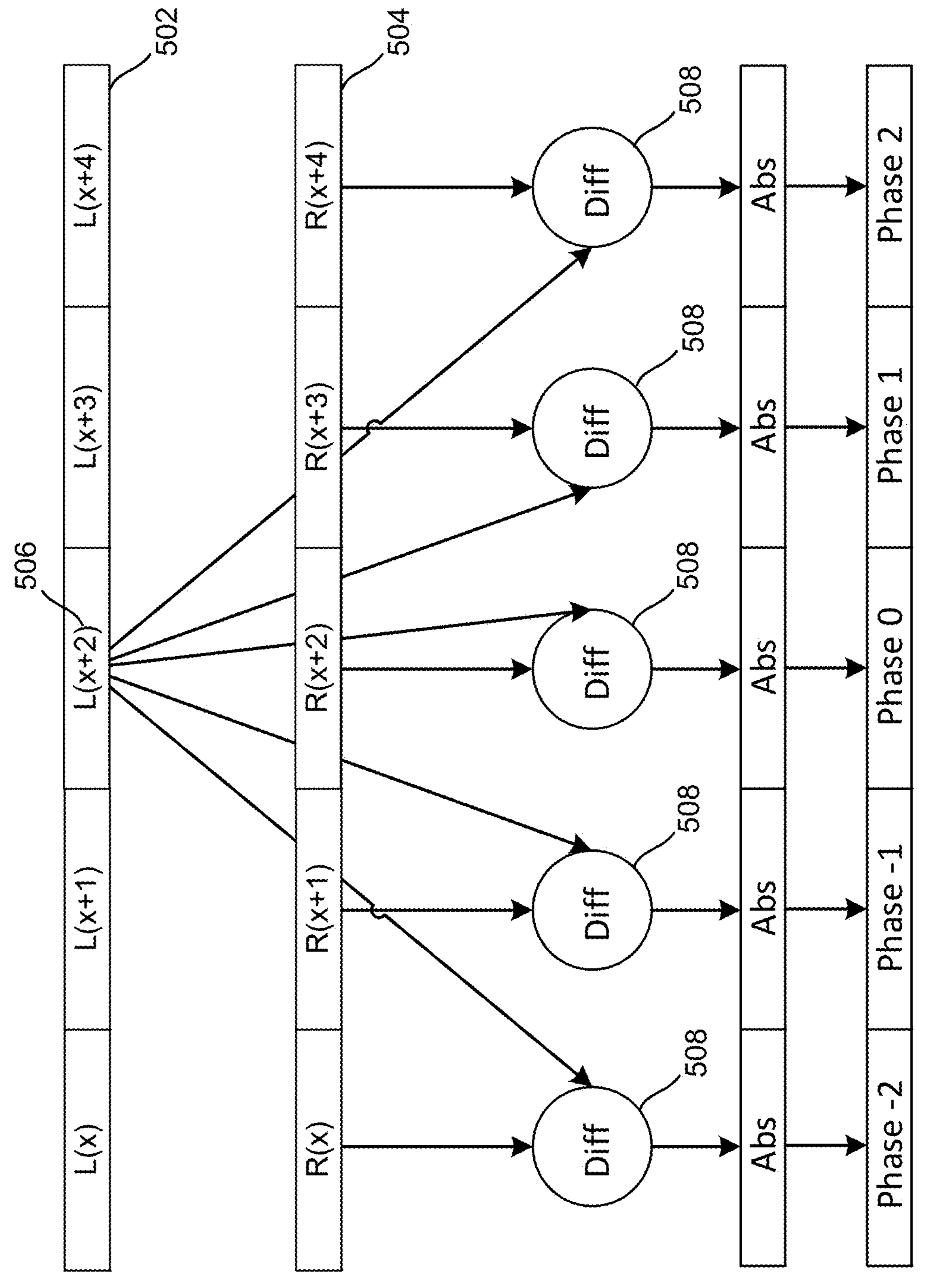
FIG. 5 is a diagram illustrating an example for determining PD stats for a camera system, in accordance with aspects of the present disclosure.

FIG. 5 is a diagram illustrating an example for determining PD stats 500 for a camera system, in accordance with aspects of the present disclosure. In some cases, the PD stats may be determined by a PD statistics collection engine, such as PD statistics collection engine 406 of FIG. 4. PD pixel data may include a left channel 502 and a right channel 504 for a PD pixel corresponding to PD pixel data collected from a left photodiode and a right photodiode of a PD pixel, respectively. Of note, while a PD pixel with two photodiodes are shown, it should be understood that the concepts discussed herein may be applied to PD pixels with any number of photodiodes. In some cases, the PD pixel data may be obtained with incremental offsets in pixels of the pixel grid to generate PD pixel data with multiple phases, such as five phases (e.g., pixel locations) from −2 to 2 centered at location x+2 on the left channel 502. Phases may refer to an offset between PD channels. In some cases, PD pixel data from multiple phases may be obtained for by selecting and obtaining PD pixel data for a certain phase (e.g., location) of the base channel, such as the left channel 502 at location x+2 (e.g., a base location 506) and obtaining PD pixel data from different pixel offsets (e.g., from PD pixels that are offset to the left and right of a base location on the pixel grid) from the right channel 504 (e.g., from phases −2, −1, 0, 1, 2 in this example, or left channel locations for phase −2and −1, and right channel locations for phase +1 and +2). In some cases, the base location may be selected based on a region of interest (ROI), such as a detected face/object, user provided ROI via a selection on a preview image, etc. Based on phases computed for pixels in an ROI, a PDAF algorithm may determine a direction of motion for the sensor along with a measure of confidence in the result. These data may be used in the final decision making on the magnitude and direction of the motion of the image sensor.

The PD pixel data from the base location 506 (e.g., at location x+2 from the left channel 502) may be compared to the PD pixel data from the different phase offsets of the other channel (e.g., right channel 504) to generate phase information. For example, differences 508 between the PD pixel data from the base location 506 and the PD pixel data from phases x, x+1, x+2, x+3, x+4 of the right channel 504 may be determined. An absolute value for the differences 508 may be determined as the phase information for each pixel location from the right channel 504. The phase information from the different pixel locations may be combined to generate PD stats indicating phase differences for locations around the image. The PD stats may be used to identify a lens position for focusing to capture a future image.

In some cases, the PD pixel data from the left channel 502 and the right channel 504 may be obtained from a same exposure. For example, the PD pixel data may be obtained from an SE exposure, ME exposure, or LE exposure. In some cases, if the PD pixel data is obtained from an SE exposure and the SE exposure was captured in a relatively dim environment, portions of the SE exposure may be underexposed and thus the PD pixel data in these portions may be undersaturated. Similarly, if the PD pixel data is obtained from an LE exposure and the LE exposure was captured in a relatively bright environment, portions of the LE exposure may be overexposed and thus the PD pixel data in these portions may be oversaturated. PD pixel data obtained from an ME exposure may, in some cases, be unexposed and/or overexposed Where the PD pixel data is undersaturated or oversaturated, a camera system, such as camera system 400, where PD pixel data from a single exposure is used for PDAF, may have inaccurate auto-focusing. This may be because the underexposed or over-exposed areas may not have sufficient PD pixel data for focusing information to be determined accurately. For example, in the underexposed or overexposed areas there may be insufficient PD pixel data to identify a phase of the multiple phases, for example, from the right channel 504 most similar to the PD pixel data from a base phase.

In some cases, to avoid potential inaccurate autofocusing for underexposed and/or overexposed areas, the focusing information may be determined based on PD statistics collected from each stream (e.g., from the SE image, ME image, and LE image) of PD pixel information. As discussed above with respect to FIG. 4, the selector 412 may be omitted and multiple exposures 408 may be passed into the PD statistics collection engine 406. Statistical information about the PD pixel data (e.g., PD stats) may be determined from each stream. In some cases, separate hardware for generating PD stats for each stream may be used. The generated PD stats for each of the streams may be output to the memory 414 by the PD statistics collection engine 406. The PD stats for each of the streams may be loaded from the memory by the PD pixel focusing engine 416. The PD pixel focusing engine 416 may then determine a lens position using all, or any of the different exposures in a manner similar to that discussed with respect to FIG. 5. As indicated above, determining a lens position for focusing using multiple different exposures may be costly in terms of hardware, memory bandwidth, memory storage, and/or additional computing power as compared to determining the lens position based on a single exposure. In some cases, the added computational resources for determining the lens position using multiple different exposures may be not suitable for low cost and/or low power devices. In some cases, techniques to allow the lens position to be determined using multiple exposures while limiting computational resource usage may be useful.

In some cases, an HDR map may be used to allow multiple exposures to be used to determine the lens position while limiting computational resource usage. An HDR map may be a representation of an amount of weight applied to different areas of an HDR image for each exposure (e.g., LE, ME, SE) when blending the exposures to generate the HDR image. For example, pixels in a darker region may have higher weight for the LE image, while pixels in brighter regions may have a higher weight for the LE image. In some cases, as a higher amount of weightage for the LE image may indicate that a ROI of the image is in a darker (e.g., undersaturated) region, and PD stats may be obtained from the LE image. Similarly, a higher amount of weightage for the SE image may indicate that the ROI of the image is in a lighter (e.g., oversaturated) region and PD states may be obtained from the SE image.

Figure 6:
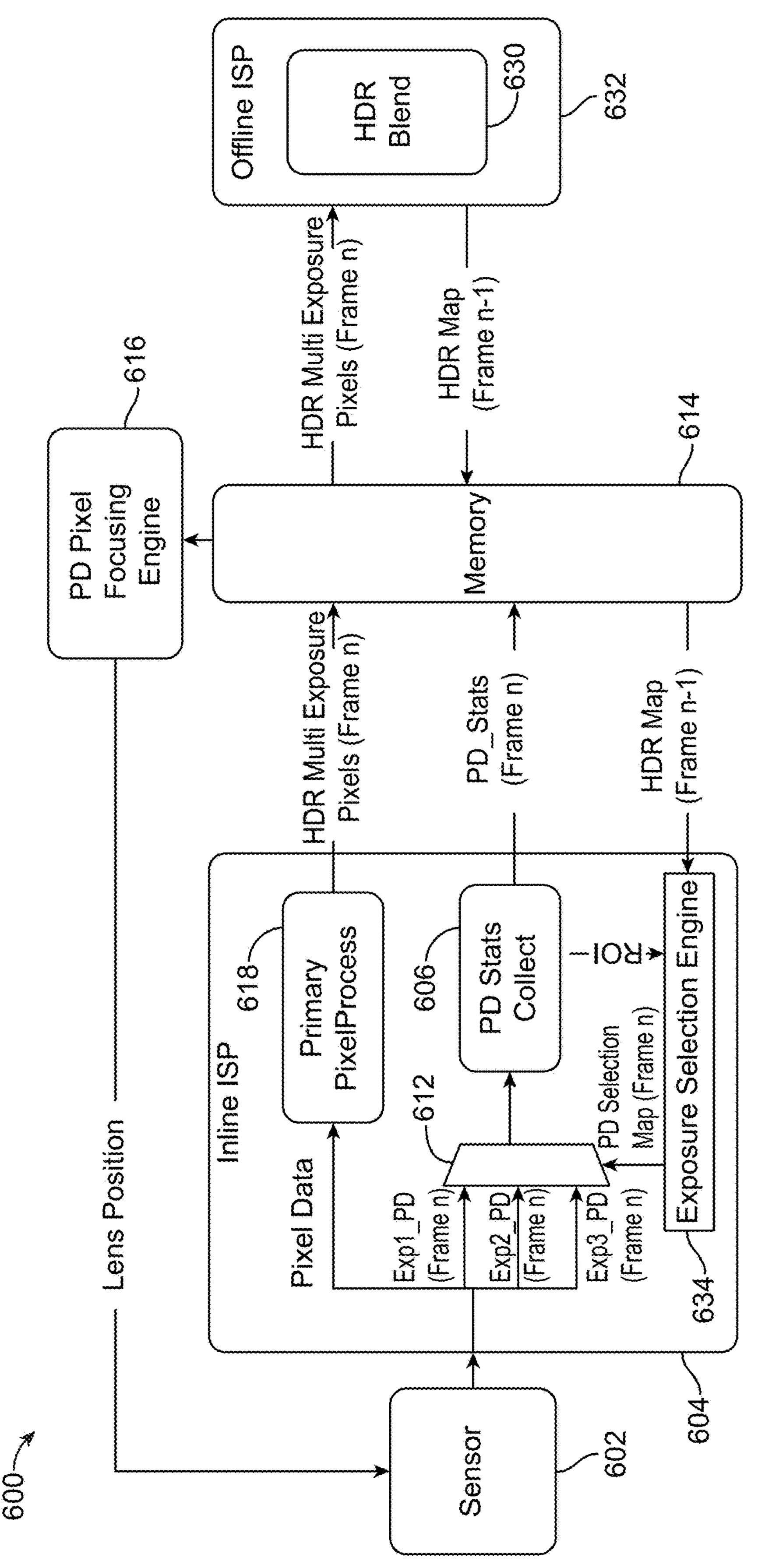
FIG. 6 is a block diagram illustrating a camera system for leveraging HDR maps for improved auto focus, in accordance with aspects of the present disclosure.

FIG. 6 is a block diagram illustrating a camera system 600 for leveraging HDR maps for improved auto focus, in accordance with aspects of the present disclosure. The camera system 600 includes a sensor 602 that may be substantially similar to sensor 402 of FIG. 4. The sensor 602 may generate a stream of data from the sensor 602 that may be passed to an inline image signal processor (ISP) 604. The sensor 602 may generate multiple images captured at different exposures, such as SE images, ME images, and LE images, for example, to be used to generate an HDR image at a time n−1. In some cases, pixel data from the multiple exposures may be passed to a primary pixel processing engine 618. The primary pixel processing engine 618 may preprocess the pixel data and output the preprocessed pixel data captured at n−1 to the memory 614. The preprocessed pixel data maybe loaded from the memory 614 and processed by an HDR blend engine 630 of an offline ISP 632. The HDR blend engine 630 may be hardware for generating an HDR images and the HDR blend engine 630 may generate an HDR map as a part of generating an HDR image. The HDR map may be used internally by the HDR blend engine 630 to blend the multiple exposures to generate the HDR images. In some cases, an HDR map may be generated by the HDR blend engine 630 for each set of different exposures input for generating an HDR image. The generated HDR map for the images captured at n−1 may be stored to the memory 614 by the HDR blend engine 630.

In some cases, the sensor 602 may capture another set of exposures (e.g., SE, ME, LE images) at time n and stream the PD data from the set of exposures to a selector 612 of the inline ISP 604. An exposure selection engine 634 may may obtain the HDR maps stored in the memory 614 by the HDR blend engine 630 for the images captured at n−1. The exposure selection engine 634 may also receive information about an ROI 636. In some cases, the ROI 636 may be provided by a user, for example, selecting a part of a preview image.

In some cases, the exposure selection engine 634 may determine which exposure is more highly weighted for pixels of a particular area of the HDR map and the exposure selection engine 634 may select the corresponding exposure and send an indication of the selection to the selector 612 to switch between the PD pixel data streams to generate a mixed data stream with PD pixel data associated with multiple exposures. For example, if the HDR map indicates that the LE image is more heavily weighted a portion of the HDR map, then the exposure selection engine 634 may select the PD pixel data from the LE to be passed into the PD statistics collection engine 606 in the mixed data stream. If, in another region, the SE image is more heavily weighted in the HDR map, the exposure selection engine 634 may select to use the PD pixel data from the LE to be passed into the PD statistics collection engine 606 in the mixed data stream. The PD statistics collection engine 606 may then generate PD statistics based on the PD pixel data (e.g., the LE PD pixel data) passed in from the selector 612. In some cases, the PD statistics collection engine 606 may generate PD statistics in a manner described in conjunction with FIG. 7 and FIG. 8. The PD statistics collection engine 606 may store the generated PD statistics into the memory 614.

In some cases, a PD pixel focusing engine 616 may load the PD statistics from the memory 614. In some cases, the PD pixel focusing engine 616 may be a part of the offline ISP 632. For example, the PD pixel focusing engine 616 may be implemented as software executing on the offline ISP 632. In other cases, the PD pixel focusing engine 616 may be implemented as software executing on a separate processor, such as processor 1210 of FIG. 12. The PD pixel focusing engine 616 may determine a lens position for focusing a lens, for example, for an image captured at time n+1. As the exposure selection engine 634 can dynamically change the exposure from which PD stats are collected from, the PD pixel focusing engine 616 may configured to determine focus information based on different exposures. In some cases, the PD pixel focusing engine 616 may be substantially similar to PD pixel focusing engine 416 of FIG. 4

Figure 7:
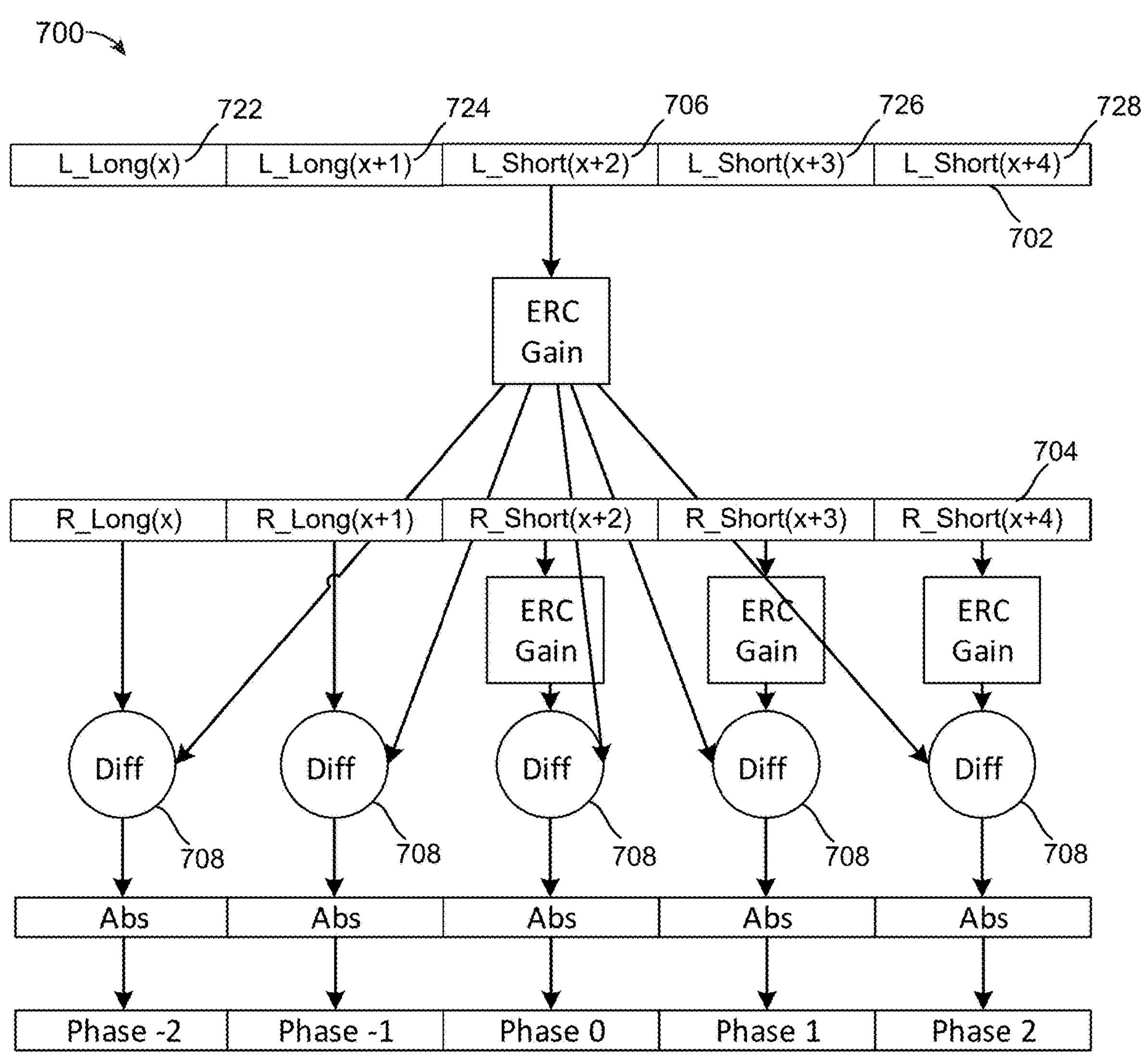
FIG. 7 is a diagram illustrating a technique for determining PD stats based on different exposures, in accordance with aspects of the present disclosure.

FIG. 7 is a diagram illustrating a technique for determining PD stats 700 based on different exposures, in accordance with aspects of the present disclosure. In some cases, the PD stats may be determined by a PD statistics collection engine, such as PD statistics collection engine 606 of FIG. 6. In this example, PD pixel data from a left channel 702 and a right channel 504 may be obtained for a set of PD pixels centered around a base location 706, here location x+2, in a manner similar to that described above with respect to FIG. 5. In FIG. 7, the PD pixel data from different pixel offsets may be obtained from different exposures (e.g., based on an HDR map as discussed above with respect to FIG. 6). For example, the PD pixel data from location x 722 and location x+1 724 may have been obtained from a LE, while PD pixel data for the base location 706, location x+3 726, and location x+4 728 may have been obtained from a SE.

In some cases, PD pixel data obtained from different exposures may have different intensity values (e.g., gain values). In some cases, to more accurately compare PD pixel data with different exposures, it may be useful to minimize (e.g., cancel out) such differences in intensity. To compensate for the difference in exposures, exposure ratio compensation (ERC) engines 730 may be added. The ERC engines 703 may adjust the intensity values based on a difference in the exposure times between the different exposures. For example, the ERC engines 730 may attempt to bring all of the intensity values (e.g., gain values) to an equal level by multiplying the PD pixels associated with the SE by multiplying the intensity values of the PD pixels associated with the SE by a value. This value may be determined based on a difference in the exposure times between, for example, the SE and the LE images. An absolute value of differences 708 between the PD pixel data from the base location 706 and the ERC gain adjusted PD pixel data from phases x, x+1, x+2, x+3, x+4 of the right channel 704 may be determined to generate PD stats in a manner substantially similar to that described above with respect to FIG. 5.

Figure 8:
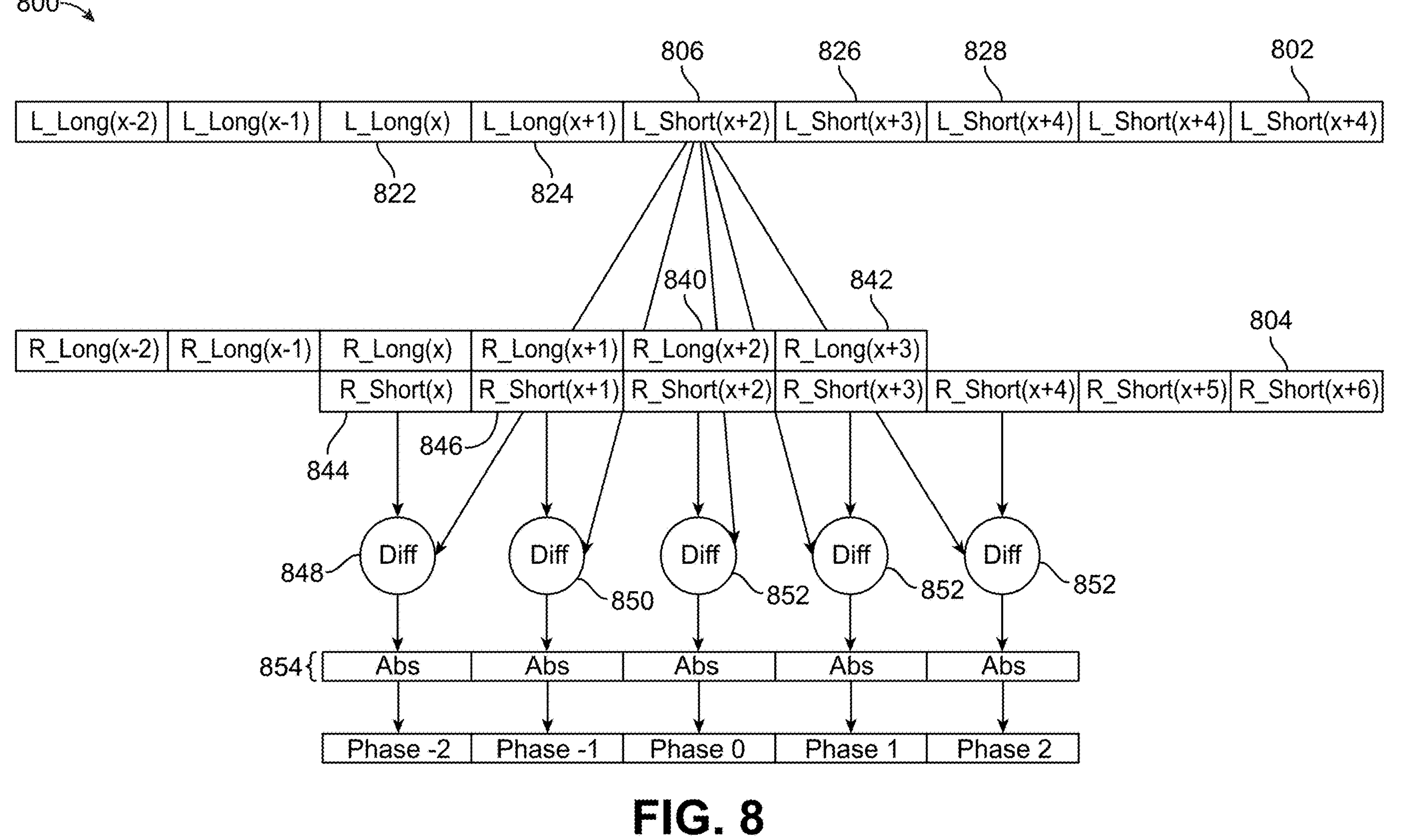
FIG. 8 is a diagram illustrating another technique for determining PD stats based on different exposures, in accordance with aspects of the present disclosure.

FIG. 8 is a diagram illustrating another technique for determining PD stats 800 based on different exposures, in accordance with aspects of the present disclosure. In some cases, the techniques discussed in FIG. 8 may be used in place of, or in conjunction with, the techniques discussed with respect to FIG. 7. In this example, PD pixel data from a left channel 802 and a right channel 804 may be obtained for a set of PD pixels centered around a base location 806, here location x+2, in a manner similar to that described above with respect to FIG. 5. In FIG. 8, the PD pixel data from different pixel offsets may be obtained from different exposures (e.g., based on an HDR map as discussed above with respect to FIG. 6). In FIG. 8, the PD pixel data from location x 822 and location x+1 824 may have been obtained from a LE and PD pixel data from the base location 806, location x+3 826, and location x+4 828 may have been obtained from a SE.

In some cases, it may be useful to obtain phase data using PD pixel data from different locations with a corresponding exposure as a base location 806 despite a transition from one exposure to another. For example, based on a transition from one exposure to another, such as from the LE PD pixel data at location x+1 824 to the SE PD pixel data at the base location 806, additional PD pixel data may be obtained based on the pre-transition and post-transition exposures. Here, as the pre-transition PD pixel data was obtained from the LE data stream, additional PD pixel data 840 and 842 from the LE data stream post-transition at location x+2 and location x+3 826, respectively, may be obtained for the non-base channel (e.g., right channel 804). Similarly, as the post-transition PD pixel data was obtained from the SE data stream, additional PD pixel data 844 and 846 from the SE data stream post-transition at location x 822 and location x+1 824, respectively, may be obtained for the non-base channel. The number of additional pre-transition and post-transition PD pixel data that may be obtained may be based on the number of phases used for determining PD stats (e.g., the number of phases used for determining PD stats minus 1).

The PD pixel data from the base location 806 may be compared to PD pixel data from the additional PD pixel data as well as the PD pixel data obtained from different exposures (e.g., based on an HDR map as discussed above with respect to FIG. 6). In some cases, an absolute difference between the PD pixel data from the base location 806 and the PD pixel data obtained from exposures corresponding to the exposure at the base location 806 may be found. For example, a difference 848 between the PD pixel data from the base location 806 and the additional PD pixel data 844 (e.g., at location x 822) may be determined, as well as a difference 850 between the PD pixel data from the base location 806 and the additional PD pixel data 846 (e.g., at location x+1 824). A difference 852 between the PD pixel data from the base location 806 and the PD pixel data obtained from the SE at location x+3 and location x+4 corresponding to the exposure (e.g., SE) at the base location 806 may be found. Absolute values 854 of the difference 848, difference 850, and differences 852 may then be found to generate PD stats indicating phase differences for locations around the image.

Figure 9:
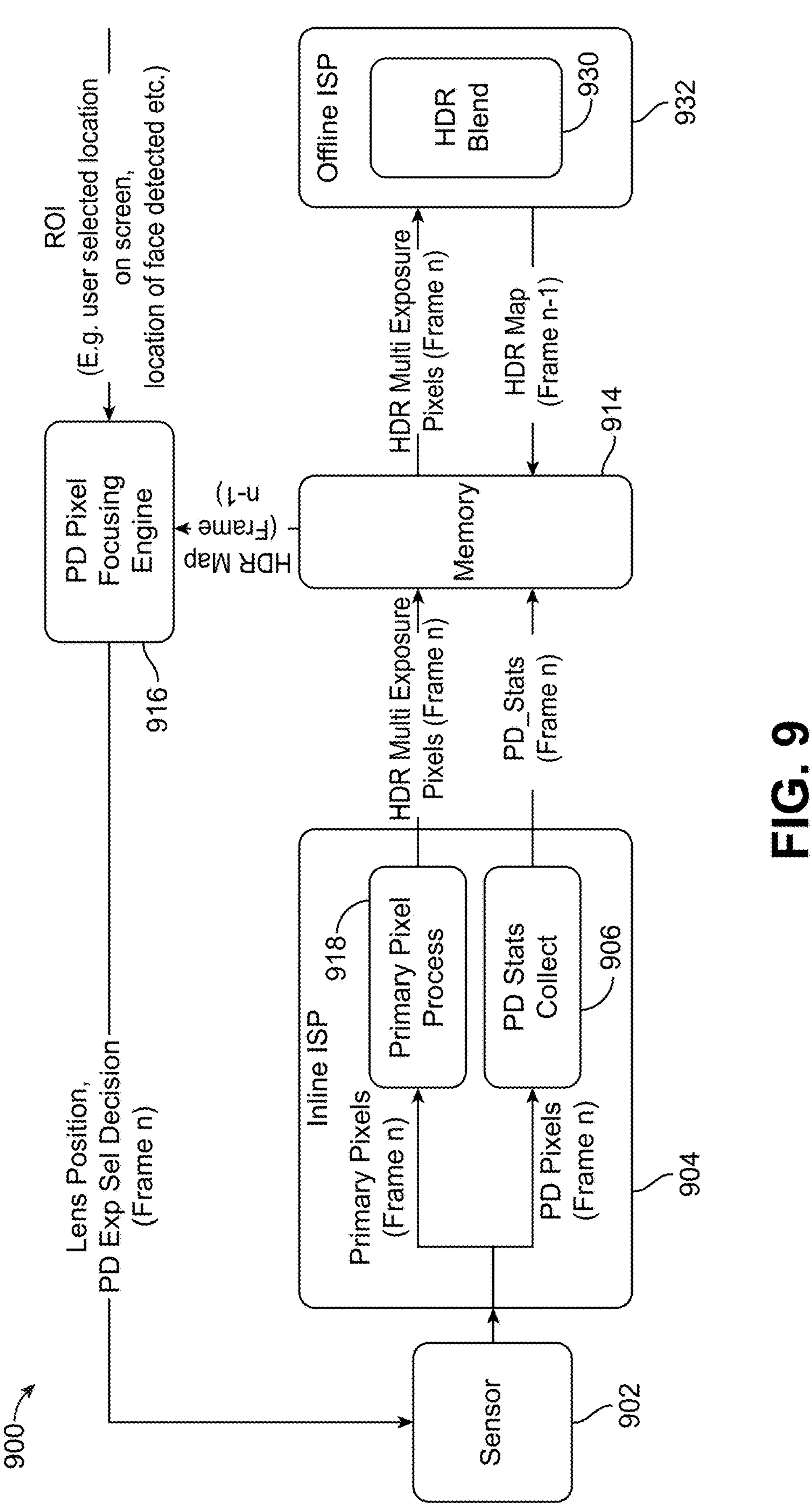
FIG. 9 is a block diagram illustrating another camera system for leveraging HDR maps for improved auto focus, in accordance with aspects of the present disclosure.

FIG. 9 is a block diagram illustrating another camera system 900 for leveraging HDR maps for improved auto focus, in accordance with aspects of the present disclosure. The camera system 900 includes a sensor 902 that may be substantially similar to sensor 402 of FIG. 4 and sensor 602 of FIG. 6. The camera system may be similar to camera system 600 in that the sensor 902 may generate multiple images captured at different exposures, such as SE images, ME images, and LE images and the primary pixels of the images may be streamed to a primary pixel processing engine 918 of an inline ISP 904. The primary pixel processing engine 918 may preprocess the pixel data and store the preprocessed pixel data captured at n−1 to the memory 914. The stored preprocessed pixel data maybe loaded from the memory 914 and processed by an HDR blend engine 930 of an offline ISP 932 and an HDR map may be generated for the images captured at time n−1. The HDR map for the images captured at time n−1 may be stored to the memory 914 by the HDR blend engine 930.

A PD pixel focusing engine 916 may load the HDR map for the images captured at time n−1 from the memory 914. In some cases, the PD pixel focusing engine 916 may be a part of the offline ISP 932. For example, the PD pixel focusing engine 916 may be implemented as software executing on the offline ISP 932. In other cases, the PD pixel focusing engine 916 may be implemented as software executing on a separate processor, such as processor 1210 of FIG. 12. In some cases, PD pixel focusing engine 916 may use the HDR map for the images captured at time n−1 to determine a PD exposure selection map for images captured at time n. The PD exposure selection map may indicate which PD pixel exposure PD data should be included (e.g., for inclusion) in the left channel and right channel to be sent (e.g., for transmission, to be transmitted) to a PD statistics collection engine 906. In some cases, the PD exposure selection map may take into consideration transitions between the different exposures, as indicated by the HDR map, and the PD exposure selection map may indicate which exposure's PD pixel data should be sent in the left channel and the right channel stream and when to transition from one exposure to another, taking into account the locations where phase information may be found.

The PD pixel focusing engine 916 may also determine a lens position for focusing a lens, for example, for the images to be captured at time n. The lens position and PD exposure selection map may be sent to the sensor 902.

The sensor 902 may focus the lens based on the lens position received from the PD pixel focusing engine 916 and generate multiple images captured at different exposures at a time n. The sensor 902 may pass the pixel data from the multiple exposures of the primary pixels (e.g., non-PD pixels) to the primary pixel processing engine 918. The sensor 902 may also select (e.g., via an internal selector) the which exposure, from among the multiple exposures (e.g., LE, ME, and/or SE), of the PD pixels to pass to a PD statistics collection engine 906 based on the PD exposure selection map. While PD pixel data for a single exposure may be transmitted, the specific exposure (e.g., in the left channel and right channel data streams) may be switched from among the multiple exposures based on the PD exposure selection map. The PD pixel data may be transmitted (e.g., streamed), to the PD statistics collection engine 906. The PD statistics collection engine 906 may then generate PD stats in a manner similar to that described with respect to FIG. 8. In some cases, the sensor 902 may stream PD pixel data from single exposure to the PD statistics collection engine 906 and thereby reducing n amount of power and bandwidth used to transmit data between the sensor 902 and the PD statistics collection engine 906. The generated PD stats may be saved to the memory 914 and used by the PD pixel focusing engine 916 to generate a lens position for the sensor 902 in a manner substantially similar to that discussed above with respect to PD pixel focusing engine 416 of FIG. 4.

Figure 10:
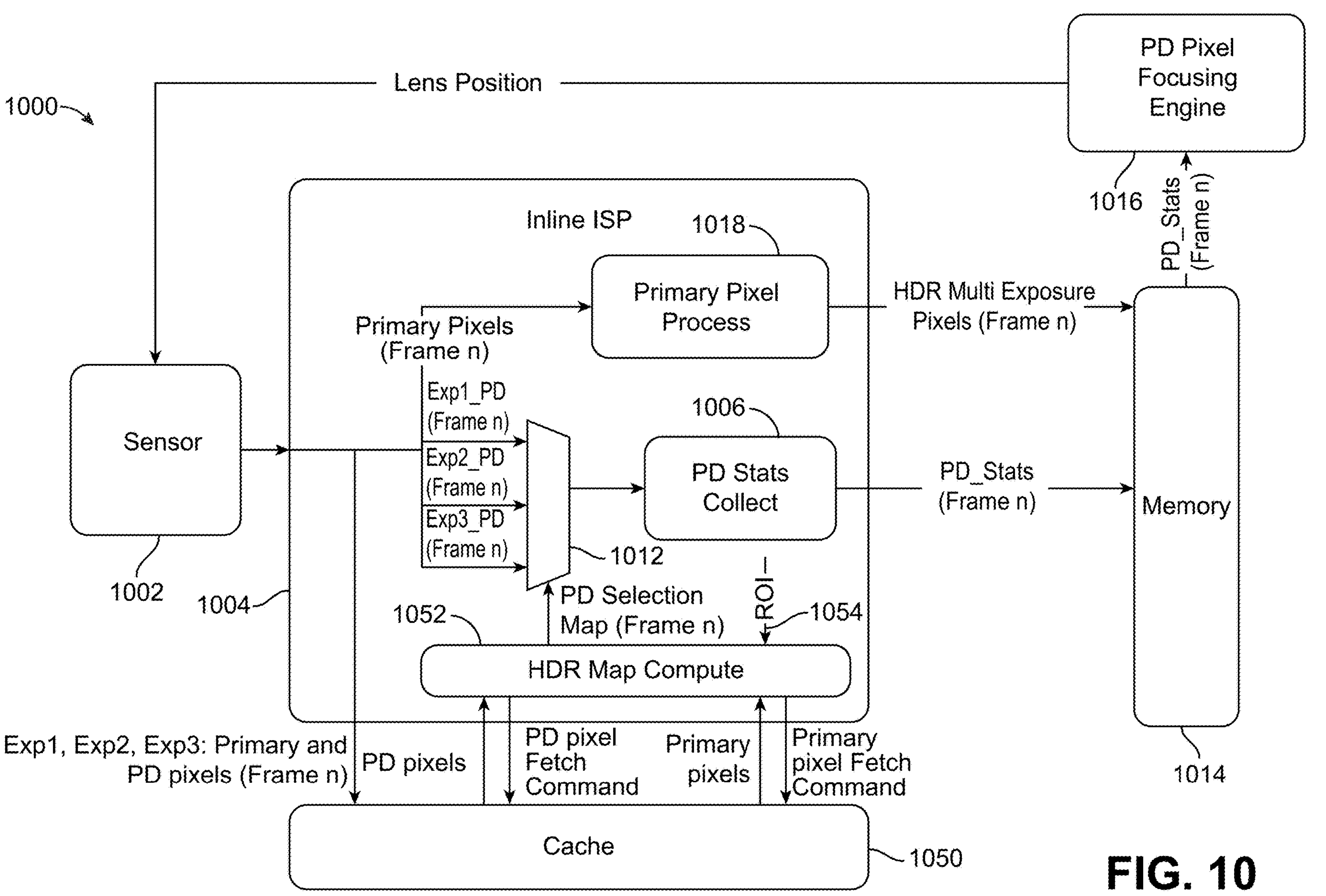
FIG. 10 is a block diagram illustrating another camera system for leveraging HDR maps for improved auto focus, in accordance with aspects of the present disclosure.

FIG. 10 is a block diagram illustrating another camera system 1000 for leveraging HDR maps for improved auto focus, in accordance with aspects of the present disclosure. The camera system 1000 includes a sensor 1002 that may be substantially similar to sensor 402 of FIG. 4, sensor 602 of FIG. 6, and sensor 902 of FIG. 9. The camera system may be similar to camera system 600 in that the sensor 1002 may generate multiple images captured at different exposures, such as SE images, ME images, and LE images. The primary pixels (e.g., primary pixel data) of the images may be streamed to a primary pixel processing engine 1018 of an inline ISP 1004 and the primary pixel processing engine 918 may process the primary pixels in a manner substantially similar to that described with respect to the primary pixel processing engine 418 of FIG. 4.

In some cases, the primary pixel data along with the PD pixel data from the multiple exposures may be streamed to a cache 1050. A HDR map compute engine 1052 of the inline ISP 1004 may load the primary pixels and compute an HDR map. In some cases, the HDR map may be computed in a manner substantially similar to how the HDR map was computed by an HDR blend engine, such as HDR blend engine 630 of FIG. 6 and/or HDR blend engine 930 of FIG. 9. Based on the HDR map, the HDR map compute engine 1052 may also generate a PD exposure selection map in a manner substantially similar to that described above with respect to FIG. 9. In some cases, the PD exposure selection map and the HDR map may be generated based on an ROI 1054. After the HDR map and/or PD exposure selection map is determined, a PD fetch command may be used by the HDR map compute engine 1052 to obtain the PD pixel data from the corresponding exposures based on the HDR map and/or PD exposure selection map from the cache 1050. For example, the PD pixel data from exposures selected based on the PD exposure map may be fetched from the cache 1050 and input to a selector 1012 and passed to a PD statistics collection engine 1006. In some cases, the selector 1012 may be omitted. The PD statistics collection engine 1006 may then generate PD stats in a manner similar to that described with respect to FIG. 7. In some cases, the generated PD stats may be saved to the memory 1014 and used by the PD pixel focusing engine 1016 to generate a lens position for the sensor 1002 in a manner substantially similar to that discussed above with respect to PD pixel focusing engine 416 of FIG. 4.

Figure 11:
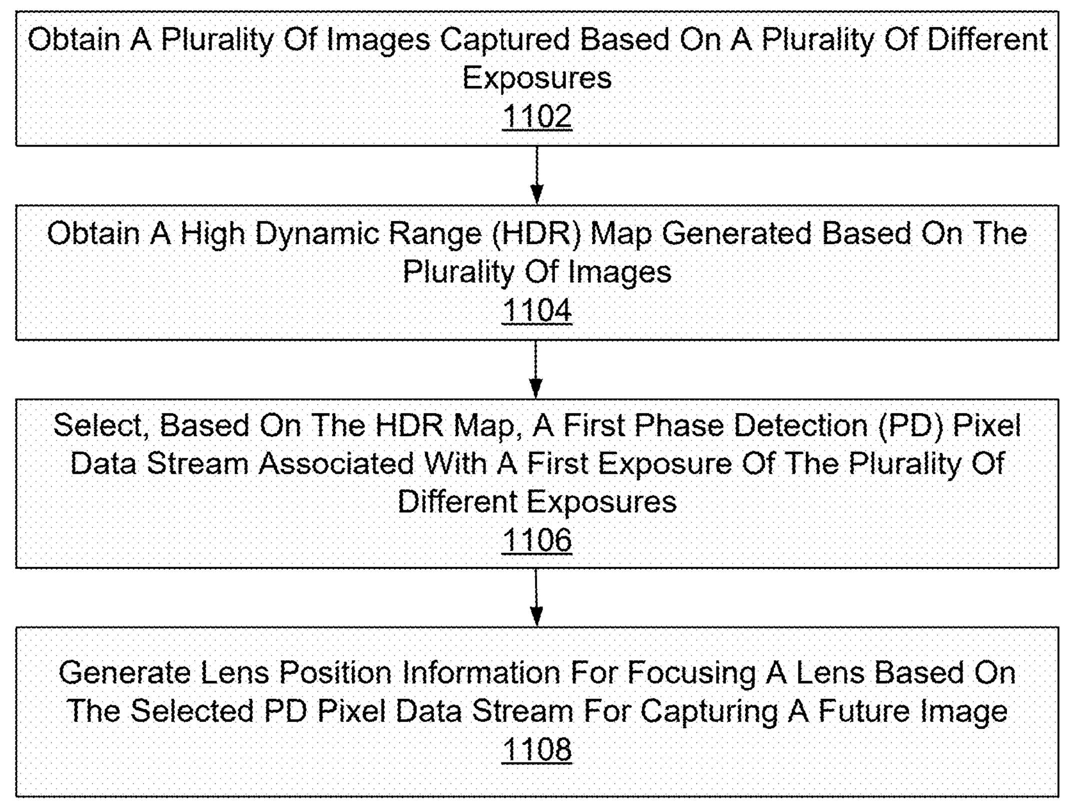
FIG. 11 is a flow diagram illustrating a process for focusing, in accordance with aspects of the present disclosure.

FIG. 11 is a flow diagram illustrating a process 1100 for capturing images, in accordance with aspects of the present disclosure. The process 1100 may be performed by a computing device (e.g., apparatus, PDAF camera system 100 of FIG. 1A-1C, computing system 1200 of FIG. 12, etc.) or a component (e.g., camera system 600 of FIG. 6, camera system 900 of FIG. 9, camera system 1000 of FIG. 10, processor 1210 of FIG. 12, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 1100 may be implemented as software components that are executed and run on one or more processors.

At block 1102, the computing device (or component thereof) may obtain a plurality of images captured based on a plurality of different exposures (e.g., short exposure image 300, middle exposure image 310, and long exposure image 320 of FIG. 3). In some cases, the plurality of different exposures includes three different exposures.

At block 1104, the computing device (or component thereof) may obtain a high dynamic range (HDR) map generated based on the plurality of images. For example, an HDR blend engine 630 of FIG. 6 may generate an HDR map as a part of generating an HDR image. In some aspects, the HDR map indicates weights that are applicable to the plurality of different exposures for portions of an image. For example, the HDR map may be used internally by the HDR blend engine 630 of FIG. 6 to blend the multiple exposures to generate the HDR images. In some examples, the computing device (or component thereof) may generate a PD exposure selection map based on the HDR map. In some cases, the PD exposure selection map indicates one or more exposures of the plurality of different exposures to be included in portions of a data stream; and receive the data stream from a sensor. In some cases, the data stream includes the first PD pixel data stream associated with the first exposure and a second PD pixel data stream associated with a second exposure. In some examples, the second PD pixel data stream is selected for inclusion in the data stream based on the PD exposure selection map. In some cases, the computing device (or component thereof) may include an image signal processor (ISP). In some examples, the ISP is configured to store in the at least one memory, a set of PD pixel data streams and a set of primary pixels of an image sensor. In some cases, each PD pixel data stream of the set of PD pixel data streams is associated with a different exposure of the plurality of different exposures. In some examples, the set of primary pixels includes pixel data from a set of non-PD pixels of the image sensor. The ISP may determine the HDR map based on the set of primary pixels and may retrieve the first phase detection (PD) pixel data stream associated with a first exposure from the at least one memory. In some cases, the computing device (or component thereof) may generate an HDR image based on the HDR map.

At block 1106, the computing device (or component thereof) may select (e.g., via selector 412 of FIG. 4, selector 612 of FIG. 6, selector 1012, of FIG. 10, etc.), based on the HDR map, a first phase detection (PD) pixel data stream associated with a first exposure of the plurality of different exposures. In some cases, the computing device (or component thereof) may generate a mixed data stream based on the first PD pixel data stream associated with the first exposure and a second PD pixel data stream associated with a second exposure of the plurality of different exposures. The second PD pixel data stream can be selected based on the HDR map. For example, the selector may switch between the PD pixel data streams to generate a mixed data stream with PD pixel data associated with multiple exposures. In some examples, the mixed data stream includes at least two channels. In some cases, the computing device (or component thereof) may generate PD statistics based on a difference between PD data in a first channel of the mixed data stream and PD data in a second channel of the mixed data stream. In some examples, the mixed data stream includes first PD pixel data from the first PD pixel data stream associated with the first exposure and second PD pixel data from the second PD pixel data stream associated with the second exposure. In some cases, the first PD pixel data and the second PD pixel data are included in the mixed data stream based on a transition between first PD pixel data stream associated with the first exposure and the second PD pixel data stream associated with the second exposure. In some examples, the computing device (or component thereof) may adjust an intensity value of the PD data in the second channel based on a transition between first PD pixel data stream associated with the first exposure and the second PD pixel data stream associated with the second exposure. In some cases, the computing device (or component thereof) may receive a plurality of PD pixel data streams and may select the first PD pixel data stream associated with a first exposure from the plurality of PD pixel data streams.

At block 1108, the computing device (or component thereof) may generate lens position information for focusing a lens (e.g., via PD pixel focusing engine 616 of FIG. 6, PD pixel focusing engine 916 of FIG. 9, PD pixel focusing engine 1016 of FIG. 10, etc.) based on the first PD pixel data stream for capturing a future image.

In some cases, the devices or apparatuses configured to perform the operations of the process 1100 and/or other processes described herein may include a processor, microprocessor, microcomputer, or other component of a device that is configured to carry out the steps of the process 1100 and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 1100 and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1100 is illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 1100 and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Figure 12:
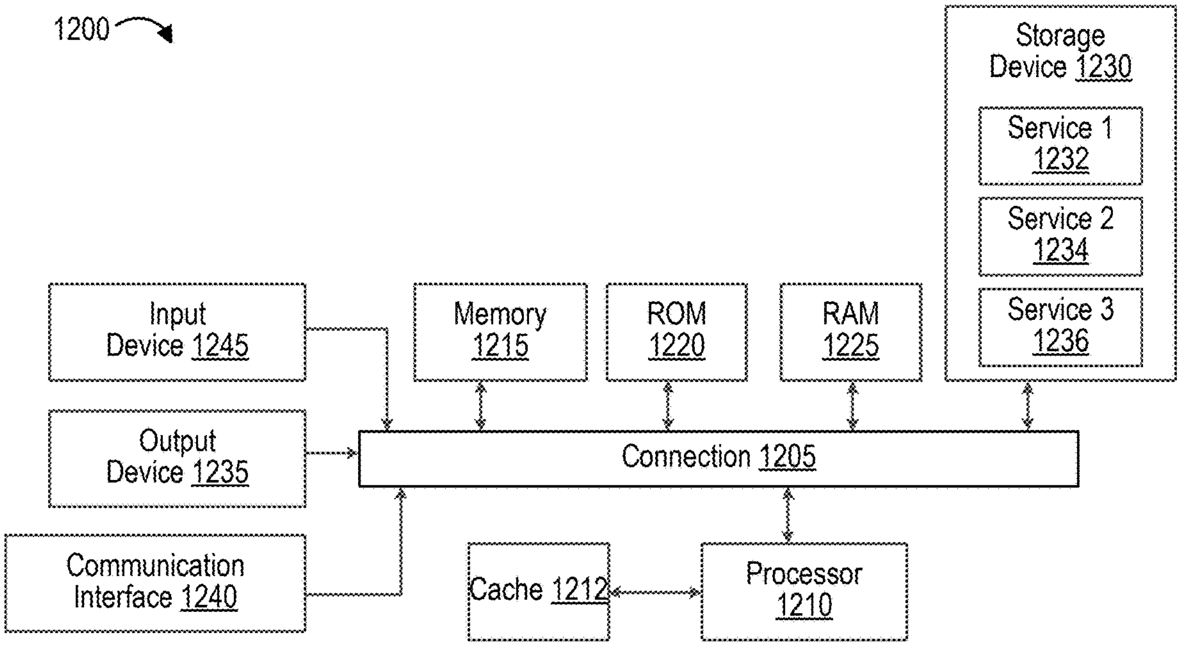
FIG. 12 is a diagram illustrating an example of a system for implementing certain aspects described herein.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for focusing, comprising: at least one memory; and at least one processor coupled to the at least one memory, the at least one processor configured to: obtain a plurality of images captured based on a plurality of different exposures; obtain a high dynamic range (HDR) map generated based on the plurality of images, wherein the HDR map indicates weights that are applicable to the plurality of different exposures for portions of an image; select, based on the HDR map, a first phase detection (PD) pixel data stream associated with a first exposure of the plurality of different exposures; and generate lens position information for focusing a lens based on the first PD pixel data stream for capturing a future image.

Aspect 2. The apparatus of Aspect 1, wherein the at least one processor is configured to generate a mixed data stream based on the first PD pixel data stream associated with the first exposure and a second PD pixel data stream associated with a second exposure of the plurality of different exposures, wherein the second PD pixel data stream is selected based on the HDR map.

Aspect 3. The apparatus of Aspect 2, wherein the mixed data stream includes at least two channels, and wherein the at least one processor is configured to generate PD statistics based on a difference between PD data in a first channel of the mixed data stream and PD data in a second channel of the mixed data stream.

Aspect 4. The apparatus of Aspect 3, wherein the at least one processor is configured to adjust an intensity value of the PD data in the second channel based on a transition between first PD pixel data stream associated with the first exposure and the second PD pixel data stream associated with the second exposure.

Aspect 5. The apparatus of any of Aspects 2 to 4, wherein the mixed data stream includes first PD pixel data from the first PD pixel data stream associated with the first exposure and second PD pixel data from the second PD pixel data stream associated with the second exposure, and wherein the first PD pixel data and the second PD pixel data are included in the mixed data stream based on a transition between first PD pixel data stream associated with the first exposure and the second PD pixel data stream associated with the second exposure.

Aspect 6. The apparatus of any of Aspects 1 to 5, wherein the at least one processor is configured to: generate a PD exposure selection map based on the HDR map, wherein the PD exposure selection map indicates one or more exposures of the plurality of different exposures to be included in portions of a data stream; and receive the data stream from a sensor, wherein the data stream includes the first PD pixel data stream associated with the first exposure and a second PD pixel data stream associated with a second exposure, wherein the second PD pixel data stream is selected for inclusion in the data stream based on the PD exposure selection map.

Aspect 7. The apparatus of any of Aspects 1 to 6, wherein the apparatus includes an image signal processor (ISP), and wherein the ISP is configured to: store in the at least one memory, a set of PD pixel data streams and a set of primary pixels of an image sensor, wherein each PD pixel data stream of the set of PD pixel data streams is associated with a different exposure of the plurality of different exposures, and wherein the set of primary pixels includes pixel data from a set of non-PD pixels of the image sensor; determine the HDR map based on the set of primary pixels; and retrieve the first phase detection (PD) pixel data stream associated with a first exposure from the at least one memory.

Aspect 8. The apparatus of any of Aspects 1 to 7, wherein the plurality of different exposures includes three different exposures.

Aspect 9. The apparatus of any of Aspects 1 to 8, wherein the at least one processor is further configured to generate an HDR image based on the HDR map.

Aspect 10. The apparatus of any of Aspects 1 to 9, wherein the at least one processor is further configured to: receive a plurality of PD pixel data streams; and select the first PD pixel data stream associated with a first exposure from the plurality of PD pixel data streams.

Aspect 11. A method for focusing by an image capturing device, comprising: obtaining a plurality of images captured based on a plurality of different exposures; obtaining a high dynamic range (HDR) map generated based on the plurality of images, wherein the HDR map indicates weights that are applicable to the plurality of different exposures for portions of an image; selecting, based on the HDR map, a first phase detection (PD) pixel data stream associated with a first exposure of the plurality of different exposures; and generating lens position information for focusing a lens based on the first PD pixel data stream for capturing a future image.

Aspect 12. The method of Aspect 11, further comprising generating a mixed data stream based on the first PD pixel data stream associated with the first exposure and a second PD pixel data stream associated with a second exposure of the plurality of different exposures, wherein the second PD pixel data stream is selected based on the HDR map.

Aspect 13. The method of Aspect 12, wherein the mixed data stream includes at least two channels, and wherein the method further comprises generating PD statistics based on a difference between PD data in a first channel of the mixed data stream and PD data in a second channel of the mixed data stream.

Aspect 14. The method of Aspect 13, further comprising adjusting an intensity value of the PD data in the second channel based on a transition between first PD pixel data stream associated with the first exposure and the second PD pixel data stream associated with the second exposure.

Aspect 15. The method of any of Aspects 12 to 14, wherein the mixed data stream includes first PD pixel data from the first PD pixel data stream associated with the first exposure and second PD pixel data from the second PD pixel data stream associated with the second exposure, and wherein the first PD pixel data and the second PD pixel data are included in the mixed data stream based on a transition between first PD pixel data stream associated with the first exposure and the second PD pixel data stream associated with the second exposure.

Aspect 16. The method of any of Aspects 11 to 15, further comprising: generating a PD exposure selection map based on the HDR map, wherein the PD exposure selection map indicates one or more exposures of the plurality of different exposures to be included in portions of a data stream; and receiving the data stream from a sensor, wherein the data stream includes the first PD pixel data stream associated with the first exposure and a second PD pixel data stream associated with a second exposure, wherein the second PD pixel data stream is selected for inclusion in the data stream based on the PD exposure selection map.

Aspect 17. The method of any of Aspects 11 to 16, wherein the image capturing device includes an image signal processor (ISP), and wherein the ISP is configured to: store in at least one memory, a set of PD pixel data streams and a set of primary pixels of an image sensor, wherein each PD pixel data stream of the set of PD pixel data streams is associated with a different exposure of the plurality of different exposures, and wherein the set of primary pixels includes pixel data from a set of non-PD pixels of the image sensor; determine the HDR map based on the set of primary pixels; and retrieve the first phase detection (PD) pixel data stream associated with a first exposure from the at least one memory.

Aspect 18. The method of any of Aspects 11 to 17, wherein the plurality of different exposures includes three different exposures.

Aspect 19. The method of any of Aspects 11 to 18, further comprising generating an HDR image based on the HDR map.

Aspect 20. The method of any of Aspects 11 to 19, further comprising: receiving a plurality of PD pixel data streams; and selecting the first PD pixel data stream associated with a first exposure from the plurality of PD pixel data streams.

Aspect 21. A non-transitory computer-readable medium having stored thereon instructions that, when executed by at least one processor, cause the at least one processor to perform any of the operations of Aspects 11 to 20.

Aspect 22: An apparatus for focusing, comprising one or more means for performing any of the operations of Aspects 11 to 20.

What is claimed is:

1. An apparatus for focusing, comprising:

at least one memory; and at least one processor coupled to the at least one memory, the at least one processor configured to:

obtain a plurality of images captured based on a plurality of different exposures;

obtain a high dynamic range (HDR) map generated based on the plurality of images, wherein the HDR map indicates weights that are applicable to the plurality of different exposures for portions of an image;

select, based on the HDR map, a first phase detection (PD) pixel data stream associated with a first exposure of the plurality of different exposures; and generate lens position information for focusing a lens based on the first PD pixel data stream for capturing a future image.

2. The apparatus of claim 1, wherein the at least one processor is configured to generate a mixed data stream based on the first PD pixel data stream associated with the first exposure and a second PD pixel data stream associated with a second exposure of the plurality of different exposures, wherein the second PD pixel data stream is selected based on the HDR map.

3. The apparatus of claim 2, wherein the mixed data stream includes at least two channels, and wherein the at least one processor is configured to generate PD statistics based on a difference between PD data in a first channel of the mixed data stream and PD data in a second channel of the mixed data stream.

4. The apparatus of claim 3, wherein the at least one processor is configured to adjust an intensity value of the PD data in the second channel based on a transition between first PD pixel data stream associated with the first exposure and the second PD pixel data stream associated with the second exposure.

5. The apparatus of claim 2, wherein the mixed data stream includes first PD pixel data from the first PD pixel data stream associated with the first exposure and second PD pixel data from the second PD pixel data stream associated with the second exposure, and wherein the first PD pixel data and the second PD pixel data are included in the mixed data stream based on a transition between first PD pixel data stream associated with the first exposure and the second PD pixel data stream associated with the second exposure.

6. The apparatus of claim 1, wherein the at least one processor is configured to:

generate a PD exposure selection map based on the HDR map, wherein the PD exposure selection map indicates one or more exposures of the plurality of different exposures to be included in portions of a data stream; and receive the data stream from a sensor, wherein the data stream includes the first PD pixel data stream associated with the first exposure and a second PD pixel data stream associated with a second exposure, wherein the second PD pixel data stream is selected for inclusion in the data stream based on the PD exposure selection map.

7. The apparatus of claim 1, wherein the apparatus includes an image signal processor (ISP), and wherein the ISP is configured to:

store in the at least one memory, a set of PD pixel data streams and a set of primary pixels of an image sensor, wherein each PD pixel data stream of the set of PD pixel data streams is associated with a different exposure of the plurality of different exposures, and wherein the set of primary pixels includes pixel data from a set of non-PD pixels of the image sensor;

determine the HDR map based on the set of primary pixels; and retrieve the first phase detection (PD) pixel data stream associated with a first exposure from the at least one memory.

8. The apparatus of claim 1, wherein the plurality of different exposures includes three different exposures.

9. The apparatus of claim 1, wherein the at least one processor is further configured to generate an HDR image based on the HDR map.

10. The apparatus of claim 1, wherein the at least one processor is further configured to:

receive a plurality of PD pixel data streams; and select the first PD pixel data stream associated with a first exposure from the plurality of PD pixel data streams.

11. A method for focusing by an image capturing device, comprising:

obtaining a plurality of images captured based on a plurality of different exposures;

obtaining a high dynamic range (HDR) map generated based on the plurality of images, wherein the HDR map indicates weights that are applicable to the plurality of different exposures for portions of an image;

selecting, based on the HDR map, a first phase detection (PD) pixel data stream associated with a first exposure of the plurality of different exposures; and generating lens position information for focusing a lens based on the first PD pixel data stream for capturing a future image.

12. The method of claim 11, further comprising generating a mixed data stream based on the first PD pixel data stream associated with the first exposure and a second PD pixel data stream associated with a second exposure of the plurality of different exposures, wherein the second PD pixel data stream is selected based on the HDR map.

13. The method of claim 12, wherein the mixed data stream includes at least two channels, and wherein the method further comprises generating PD statistics based on a difference between PD data in a first channel of the mixed data stream and PD data in a second channel of the mixed data stream.

14. The method of claim 13, further comprising adjusting an intensity value of the PD data in the second channel based on a transition between first PD pixel data stream associated with the first exposure and the second PD pixel data stream associated with the second exposure.

15. The method of claim 12, wherein the mixed data stream includes first PD pixel data from the first PD pixel data stream associated with the first exposure and second PD pixel data from the second PD pixel data stream associated with the second exposure, and wherein the first PD pixel data and the second PD pixel data are included in the mixed data stream based on a transition between first PD pixel data stream associated with the first exposure and the second PD pixel data stream associated with the second exposure.

16. The method of claim 11, further comprising:

generating a PD exposure selection map based on the HDR map, wherein the PD exposure selection map indicates one or more exposures of the plurality of different exposures to be included in portions of a data stream; and receiving the data stream from a sensor, wherein the data stream includes the first PD pixel data stream associated with the first exposure and a second PD pixel data stream associated with a second exposure, wherein the second PD pixel data stream is selected for inclusion in the data stream based on the PD exposure selection map.

17. The method of claim 11, wherein the image capturing device includes an image signal processor (ISP), and wherein the ISP is configured to:

store in at least one memory, a set of PD pixel data streams and a set of primary pixels of an image sensor, wherein each PD pixel data stream of the set of PD pixel data streams is associated with a different exposure of the plurality of different exposures, and wherein the set of primary pixels includes pixel data from a set of non-PD pixels of the image sensor;

determine the HDR map based on the set of primary pixels; and retrieve the first phase detection (PD) pixel data stream associated with a first exposure from the at least one memory.

18. The method of claim 11, wherein the plurality of different exposures includes three different exposures.

19. The method of claim 11, further comprising generating an HDR image based on the HDR map.

20. The method of claim 11, further comprising:

receiving a plurality of PD pixel data streams; and selecting the first PD pixel data stream associated with a first exposure from the plurality of PD pixel data streams.

* * * * *